US010380753B1

(12) United States Patent
Csordás et al.

(10) Patent No.: US 10,380,753 B1
(45) Date of Patent: Aug. 13, 2019

(54) METHOD AND APPARATUS FOR GENERATING A DISPLACEMENT MAP OF AN INPUT DATASET PAIR

(71) Applicant: AImotive Kft., Budapest (HU)

(72) Inventors: Róbert Csordás, Agno (CH); Ágnes Kis-Benedek, Felsotárkány (HU); Balázs Szalkai, Budapest (HU)

(73) Assignee: AImotive Kft., Budapest (HU)

( * ) Notice: Subject to any disclaimer, the term of this patent is extended or adjusted under 35 U.S.C. 154(b) by 74 days.

(21) Appl. No.: 15/992,930

(22) Filed: May 30, 2018

(51) Int. Cl.
*G06K 9/62* (2006.01)
*G06N 3/08* (2006.01)
*G06T 7/593* (2017.01)

(52) U.S. Cl.
CPC ............ *G06T 7/593* (2017.01); *G06K 9/6202* (2013.01); *G06K 9/6232* (2013.01); *G06N 3/08* (2013.01); *G06T 2207/10012* (2013.01); *G06T 2207/20084* (2013.01)

(58) Field of Classification Search
CPC .... G06T 7/593; G06K 9/6202; G06K 9/6232; G06N 3/08
See application file for complete search history.

(56) References Cited

U.S. PATENT DOCUMENTS

| 5,727,078 A | 3/1998 | Chupeau |
| 9,030,530 B2 | 5/2015 | Izzat et al. |
| 2006/0045329 A1* | 3/2006 | Jones .................. G06K 9/32 |
| | | 382/154 |
| 2008/0267494 A1 | 10/2008 | Cohen et al. |
| 2011/0176722 A1 | 7/2011 | Sizintsev et al. |
| 2012/0008857 A1 | 1/2012 | Choi |
| 2014/0147031 A1 | 5/2014 | Rzeszutek et al. |
| 2016/0144505 A1* | 5/2016 | Fong .................. B25J 9/1602 |
| | | 700/250 |

FOREIGN PATENT DOCUMENTS

| CN | 105956597 A | 9/2016 |
| WO | 0027131 A2 | 5/2000 |
| WO | 2016007261 A1 | 1/2016 |

OTHER PUBLICATIONS

Dosovitiskiy, Alexey, et al. "FlowNet" Learning Optical Flow with Convolution Networks The IEEE International Conference on Computer Vision (ICCV), 2015, pp. 2758-2766 (Year: 2015).*

(Continued)

*Primary Examiner* — Edward Park
*Assistant Examiner* — Molly Delaney
(74) *Attorney, Agent, or Firm* — Wood Herron & Evans LLP

(57) ABSTRACT

The invention is a method and an apparatus for generating a displacement map of a first input dataset and a second input dataset of an input dataset pair. The apparatus comprises
a neural network based feature extractor (25) for processing the first input dataset and the second input dataset so as to generate a feature map hierarchy (50) comprising a base pair of feature maps (20e, 30e) and a refinement pair of feature maps (20b, 30b, 20c, 30c, 20d, 30d),
a displacement unit comprising a first comparator unit for obtaining an initial displacement map using the base pair of feature maps (20e, 30e); and
a displacement refinement unit for obtain an updated displacement map for the refinement pair of feature maps (20d, 30d).

12 Claims, 7 Drawing Sheets

(56) References Cited

OTHER PUBLICATIONS

A. Kendall et al.: End-to-end learning of geometry and context for deep stereo regression, 2017, arXiv: 1703.04309.
Y. Zhong et al.: Self-supervised learning for stereo matching with self-improving ability, 2017, arXiv: 1709.00930.
N. Mayer et al.: A large dataset to train convolutional networks for disparity, optical flow, and scene flow estimation, 2015, arXiv: 1512.02134.
Ph. Fischer et al.: FlowNet: Learning optical flow with convolutional networks, 2015, arXiv: 1504.06852.
J. Pang et al.: Cascade residual learning: A two-stage convolutional neural network for stereo matching, 2017, arXiv: 1708.09204.
C. Godard et al.: Unsupervised monocular depth estimation with left-right consistency, 2017, arXiv: 1609.03677.

* cited by examiner

METHOD AND APPARATUS FOR GENERATING A DISPLACEMENT MAP OF AN INPUT DATASET PAIR

TECHNICAL FIELD

The invention relates to a method and an apparatus for generating a displacement map of a first input dataset and a second input dataset of an input dataset pair (e.g. a disparity map of a left/first image and right/second image of a stereo image pair).

BACKGROUND ART

Accurately estimating depth from stereo images, in other words to generate a disparity map therefrom is a core problem for many computer vision applications, such as autonomous (self-driving) vehicles, robot vision, augmented reality. More generally, investigation of displacements between two (correlated) images, is a widely applied tool today.

Accordingly, several different approaches are available for generating disparity maps on the basis of stereo images.

In the approaches disclosed in U.S. Pat. No. 5,727,078, US 2008/0267494 A1, US 2011/0176722 A1, US 2012/0008857 A1, US 2014/0147031 A1 and U.S. Pat. No. 9,030,530 B2 low resolution images are generated from the stereo images recorded from a scene. Disparity analysis is performed on these low-resolution images, the disparity map obtained by this analysis is enlarged, or its accuracy is increased by gradually applied enlargements.

A separate hierarchical series of lower and lower resolution images is generated for each of the stereo images in WO 00/27131 A1 and WO 2016/007261 A1. In these approaches the disparity map is generated based on the coarsest level left and right images. Upscaling of the low-resolution disparity map is applied in these documents.

The stereo images are processed by the help of neural networks in CN 105956597 A to obtain disparity map. Neural networks are used for generating feature maps and e.g. disparity for stereo images or other type of output in the following papers (several of them are available as a pre-print in the arXiv open access database of Cornell University Library):
A. Kendall et al.: End-to-end learning of geometry and context for deep stereo regression, 2017, arXiv: 1703.04309 (in the following: Kendall);
Y. Zhong et al.: Self-supervised learning for stereo matching with self-improving ability, 2017, arXiv: 1709.00930 (in the following: Zhong);
N. Mayer et al.: A large dataset to train convolutional networks for disparity, optical flow, and scene flow estimation, 2015, arXiv: 1512.02134 (in the following: Mayer);
Ph. Fischer et al.: FlowNet: Learning optical flow with convolutional networks, 2015, arXiv: 1504.06852 (in the following: Fischer);
J. Pang et al.: Cascade residual learning: A two-stage convolutional neural network for stereo matching, 2017, arXiv: 1708.09204 (in the following: Pang);
C. Godard et al.: Unsupervised monocular depth estimation with left-right consistency, 2017, arXiv: 1609.03677 (in the following: Godard).

A disadvantage of many of the prior art approaches applying neural networks is the high complexity of the implementation. Besides, the calculation-costs are high in most of the known approaches.

In view of the known approaches, there is a demand for a method and an apparatus for generating a displacement map of a first input dataset and a second input dataset of an input dataset pair (e.g. for generating a disparity map of a stereo image pair) with which the displacement map (e.g. disparity map) can be generated in a calculation-cost effective way.

DESCRIPTION OF THE INVENTION

The primary object of the invention is to provide a method and an apparatus for generating a displacement map of a first input dataset and a second input dataset of an input dataset pair (e.g. a disparity map of a stereo image pair), which are free of the disadvantages of prior art approaches to the greatest possible extent.

A further object of the invention is to provide a method and an apparatus for generating a displacement map with which a displacement map of good quality and resolution can be generated in a calculation-cost effective way with the lowest possible complexity.

The objects of the invention can be achieved by the method according to claim 1 and the apparatus according to claim 13. Preferred embodiments of the invention are defined in the dependent claims.

Throughout this document, "displacement map" shall refer to a certain n-dimensional generalized disparity, i.e. a generalization of the well-known stereo (left-right) disparity (disparity map is a special case of displacement map) or other kind of displacement maps such as the flow map in the case of investigating optical flow. However, the embodiments which are described in detail referring to the figures are illustrated by the help of the well-known example of stereo disparity (see FIG. 2). The displacement map (e.g. the n-dimensional generalized disparity map) refers to a mapping which assigns an n-dimensional displacement vector to each spatial location (such as pixels on an image).

Suppose that an input dataset (e.g. an image) or a feature map (these are the generalized images and feature maps which are processed by means of the method and apparatus according to the invention) is given with a multidimensional tensor having at least one spatial dimension and/or time dimension (the number of spatial dimensions is otherwise not constrained, it can be 1, 2, 3 or more), and a channel dimension (the channels corresponding to this dimension can be called feature channels or simply channels). An input or a feature map has N channels if its channel dimension is N, e.g. an RGB image has 3 channels, while a grayscale image has 1 channel. The expression "spatial dimension" here is not constrained in meaning, it is merely used as a distinction of these dimensions from the channel dimension, and also the time dimension can be defined separately. Then, the above defined (generalized) displacement can be represented as a tensor having the same spatial dimensions as the input dataset, and a (coordinate) channel dimension whose length is the same as the number of spatial dimensions in the input dataset tensor or less if the task is restricted to a subset of the spatial dimensions. For each spatial location (i.e. pixel or voxel, generally: data element) of the input dataset, the displacement map therefore determines a direction and magnitude of displacement, i.e. a displacement vector. The coordinates of these displacement vectors shall form the coordinate channel dimension of the tensor representing the displacement map (the channels of the displacement map may be called coordinate channels to make a distinction from the feature channels of a feature map).

The notion of displacement in a meaning of generalized disparity shall also comprise those cases where the displacement vectors are restricted to a subset of possible displacement vectors. For example, classical stereo disparity for two-dimensional left and right input dataset tensors (in this case, images) can be described by constraining the generalized disparity so that we only allow displacements in the horizontal direction. Thus, the displacement vectors can be described with one coordinate instead of two, because their vertical (y) coordinate is always zero (this is the case in the examples illustrated in the figures). So, in this case the generalized disparity may be represented by a tensor whose coordinate channel dimension is one instead of two, and whose values represent horizontal displacements only. I.e. the coordinate channel number of the disparity tensor may be equal to the actual dimensionality of the subspace of the possible displacement vectors, i.e. in this case one instead of two.

In three spatial dimensions, image elements are usually referred to as voxels, in two dimensions they may be called pixels, while in one dimension they can be called samples (e.g. in the case of voice recordings) or sample value. In the present document we shall refer to spatial locations of input dataset tensors (and feature maps) as "data elements", regardless of the number of spatial dimensions.

Thus, the input datasets do not need to be RGB images, they can be any kinds of multidimensional data, including, but not limited to: time series such as audio samples, ECG, 2D images encoded in any color space (such as RGB, grayscale, YCbCr, CMYK), 2D heat camera images, 2D depth maps coming from a depth camera, 2D depth maps produced from sparse LIDAR or RADAR scans, or 3D medical images (such as MRI, CT). The technical representation of displacement map is not limited to those described above, also other representations are conceivable. Generally, an input dataset (may be called simply input, input data or input set of data) typically has data elements in which image or other information is stored, i.e. it comprises typically digitalized information (e.g. it is a digitalized image) and, furthermore, the input dataset is typically a recording (i.e. an image of a camera).

There are multiple special cases of the application of displacement map (generalized disparity) that deserve attention. In case of stereo disparity, the two input images (special case of input dataset) correspond to images of a left and a right camera (i.e. members of a stereo image pair), and the generalized disparity is in fact a 2D vector field constrained to the horizontal dimension, so it can be (and usually is) represented by a 1-coordinate channel tensor with two spatial dimensions.

In another case of displacement map (generalized disparity), namely in case of 2D optical flow, the two input images (input datasets) correspond to frames taken by the same camera at different times (e.g. previous and current frame), i.e. these constitute the input image pair. In case of 3D image registration (another image matching process for e.g. medical purposes), one image is e.g. a diffusion MRI brain scan, the other one is a scan of a reference brain (i.e. in this process a record obtained from an investigation is compared to a reference), these two constitute an input dataset pair; and the generalized disparity is a 3D vector field, i.e. a tensor having three spatial dimensions and three coordinate channels in each tensor position for the three spatial coordinates. As mentioned above, the method and apparatus according to the invention can be generalized to any spatial dimensions with appropriate configuration of the feature extractor applied therein.

Another possible use case is matching two audio recordings in time, here the number of spatial dimensions is one (which is actually the time dimension), the two input datasets correspond to an audio recording and another reference recording, and the generalized disparity (displacement) has one spatial dimension (the time dimension) and only one coordinate channel (since the input datasets have one spatial dimension). In this case the feature extractor is applied on the time dependent function of the audio amplitudes (having a function value for each of the time instances). Apart from these examples, other applications can be devised, possibly with even more than three spatial dimensions.

BRIEF DESCRIPTION OF THE DRAWINGS

Preferred embodiments of the invention are described below by way of example with reference to the following drawings, where.

MODES FOR CARRYING OUT THE INVENTION

Figure 1:
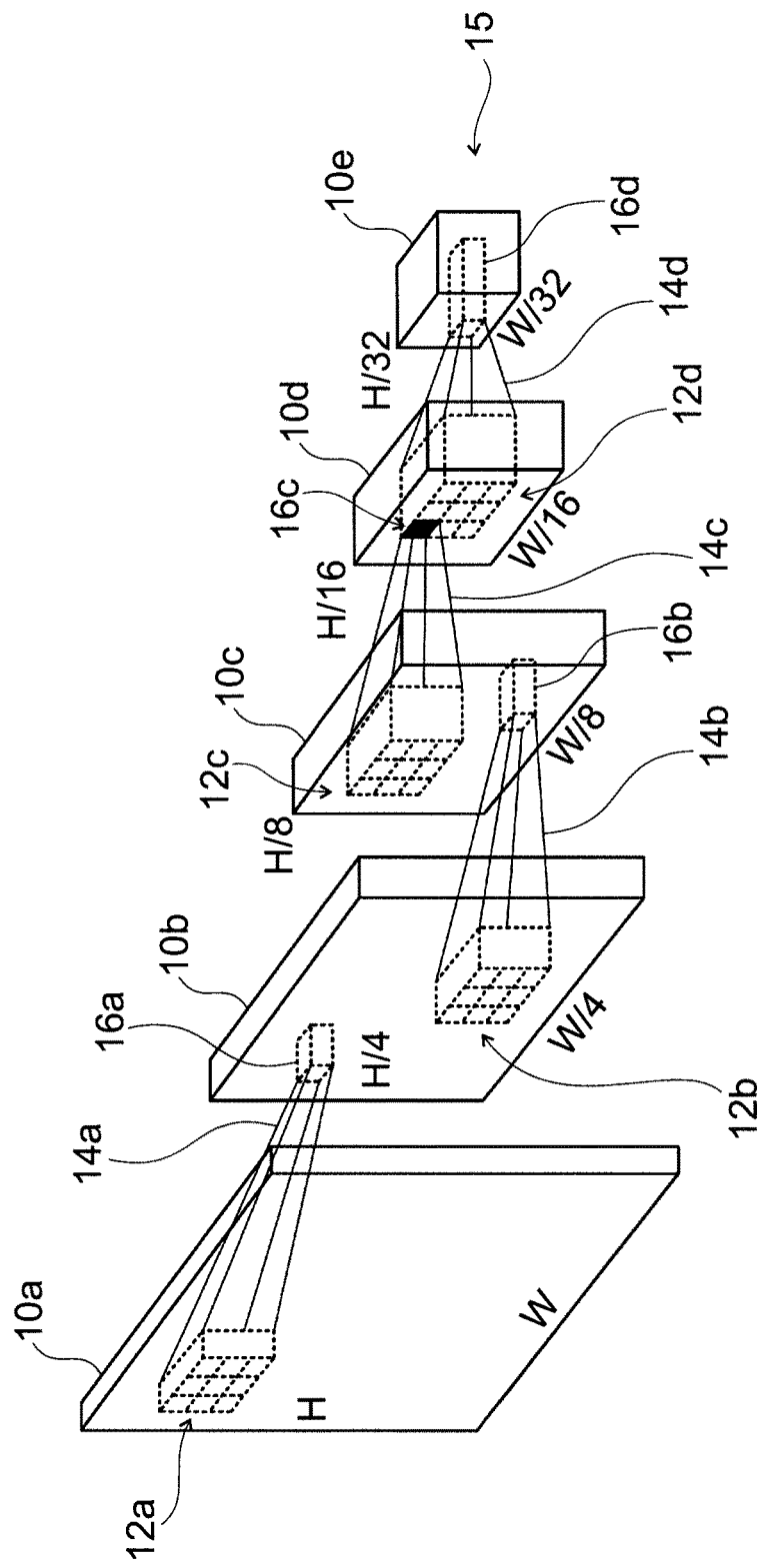
FIG. 1 illustrates an exemplary neural network based feature extractor branch.
Figure 2:
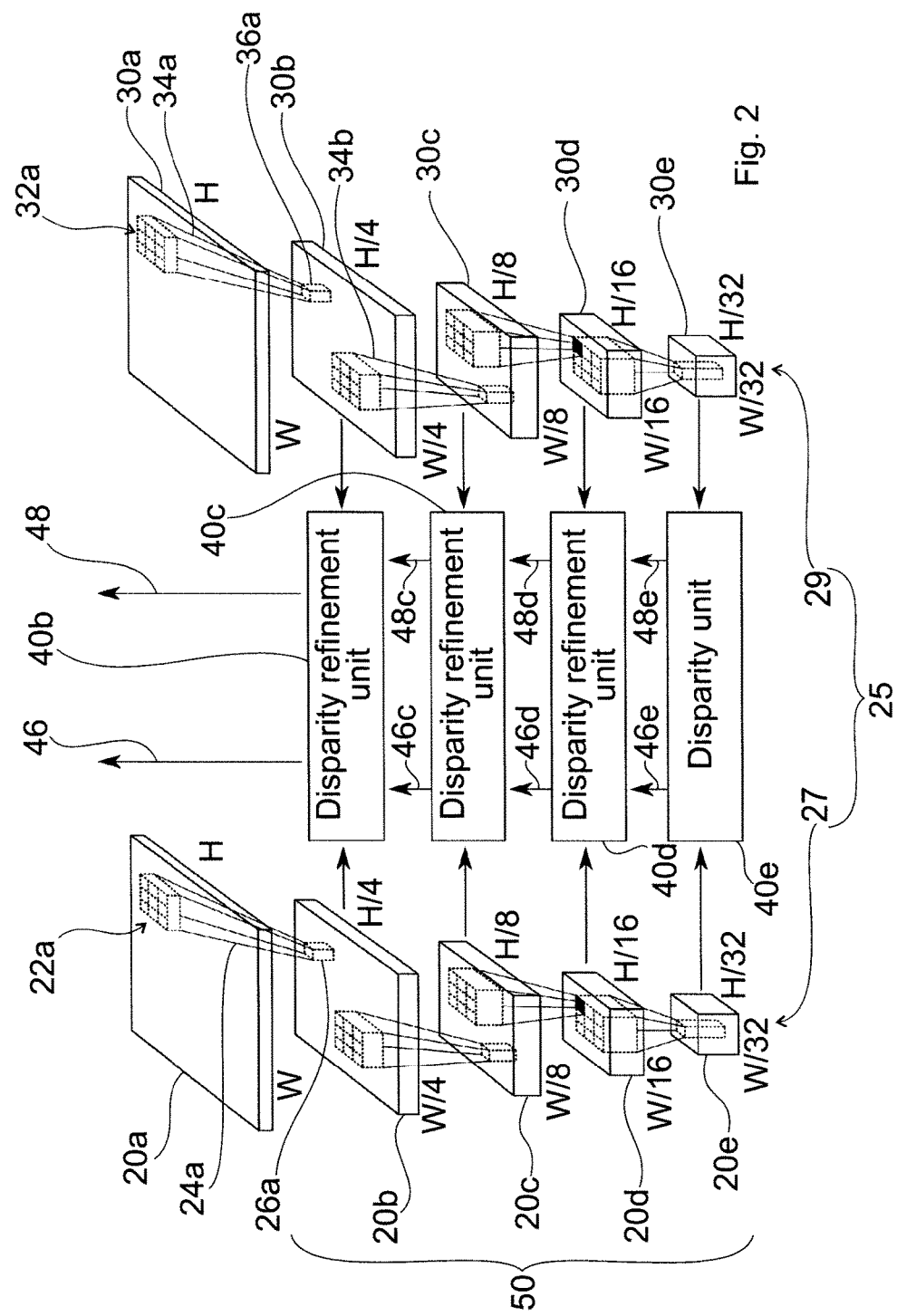
FIG. 2 shows a block diagram of an embodiment of the method and apparatus according to the invention.

FIG. 1 shows an exemplary neural network based feature extractor branch 15 (i.e. a single branch feature extractor) applied on an image (as an example of input dataset). The details of FIG. 1 serve only for illustration. The parameters shown in the figure can be selected in several different ways, see below for the details. The illustrated feature extractor branch 15 can be exemplary used in the method and apparatus according to the invention. In FIG. 2 feature extractor branches 27 and 29 (being parts of a feature extractor 25) are shown; these are very similar to the feature extractor branch 15 of FIG. 1 in order to simplify the description of this aspect of the invention based on FIGS. 1 and 2.

As shown also in FIG. 2, pixel groups selected on a level are convolution inputs (see convolution inputs 22a, 32a, exemplary denoted in the best-resolution level, highest in the figure) of the corresponding convolutions between the levels (see convolutions 24a, 34a). The output of a convolution is taken to a convolution output (see convolution outputs 26a, 36a, exemplary denoted in the highest possible level) by summing each pixel of the convolution input weighted by the corresponding element of the convolution kernel (may also be called kernel or filter). If the number of output channels in the convolution kernel is greater than one, multiple weighted sums are calculated (one for each output channel), and stacked together to form the convolution output. The size of the grid in FIG. 2 illustrates the dimensions of the convolution kernel (see convolution inputs 22a, 32a). The specific convolution inputs, kernels, convolutions and convolution outputs are shown only for illustrative purposes. In the illustrated example a 3×3 kernel is applied (i.e. a convolution with a kernel size of 3 pixels in each spatial dimension). In the 2D case, kernels are simply denoted by 3×3, 1×1, etc., but in a general case it is relevant to define the size of the kernel in every spatial dimension. Kernels with other dimensions may be also applied, i.e. kernels with sides being not equal to each other. For example, 3×1 and 1×3 kernels may be used one after the other. The number of feature channels can also be tuned by the parameters for each of the feature maps.

As emphasized above, FIG. 1 is only an illustration of a feature extractor (branch) based on a neural network. Learnable convolutions (may be called also simply convolution or convolution operator) are applied to the input image 10a by the help of which a series of feature maps 10b, 10c, 10d and 10e are generated, successively. The convolutions applied in the embodiments of the invention (i.e. in the neural network feature extractor and in the comparator unit) are convolutions [performed] by learned filter (kernel), instead of convolutions with predefined filter applied in some known approaches as mentioned above. The convolution sweeps the whole image on which it is applied by moving its kernel on the image. For the sake of simplicity, in FIGS. 1 and 2 only an exemplary position of the convolution kernel is shown for each level of the feature extractor.

Preferably, every convolution is followed by a nonlinearity layer (typically ReLU—abbreviation of Rectified Linear Units—, which is $f(x)=\max(0,x)$).

A convolution can reduce the spatial dimensions of the input layer if its stride is >1. Alternatively, separate pooling (typically average or max pooling) layers can be used to reduce spatial dimension by 2 (typically).

When the stride is 1, then the convolution kernel is moved one pixel at a time during the above mentioned sweep. When the stride is 2 then the kernel of the convolution jumps 2 pixels at a time as it is moved. The value of the stride is typically an integer. With a higher stride the kernels overlap less and the resulting output volume has smaller spatial dimensions (see also the analysis of the illustrated example of FIG. 1 below).

As mentioned above, the spatial dimension can be also reduced by the help of pooling layers. The typically applied average and max pooling layers applied as follows. Applying max pooling to a pixel group, the pixel with the maximum value is selected for each feature channel. E.g. if a 2×2 pixel group is considered by one unit of the max pooling layer, where each pixel has different intensity in each channel, then the pixel with the maximum intensity is selected for each channel, and therefore the 2×2 pixel group is reduced to a 1×1 pixel group (i.e. to a single pixel) by combining the channelwise maximum values. Average pooling layer is applied similarly, but it outputs the average of the pixel values of the investigated pixel group for each channel.

In the example shown in FIG. 1, the width and height parameters of each level (image and feature maps) are indicated. Image 10a has height H and width W. These parameters of the first feature map 10b (first in the row of feature maps) are H/4 and W/4, i.e. the spatial parameters are reduced by 4 between the starting image 10a and the first feature map 10b. The dimensions of feature map 10c are H/8 and W/8. Accordingly, the spatial parameters are reduced by 2, in the next step, similarly to the subsequent steps (the dimensions of feature map 10d are H/16 and W/16, and these are H/32 and W/32 for feature map 10e). This means that the pixel number of the feature maps of the feature map hierarchy (see also FIG. 2 for feature map hierarchy 50) is successively decreased, i.e. the resolution from the image 10a to the last feature map 10e is gradually lower and lower.

In other words, in this sequence feature maps with lower and lower resolutions are obtained (at deeper and deeper levels of the feature extractor). Since these are at deeper and deeper stages of the feature extractor, these feature maps are expected to have fewer and fewer image like properties in the sequence and have more and more feature like properties. Because of the smaller and smaller feature map size, the kernel covers areas which were larger and larger in the initial image. Thus, the recognition of larger and larger objects of the image is achievable in the lower resolution feature maps. As an example, a pedestrian, a pet or a car can be recognized in lower resolution levels (these are feature maps that typically comprise higher-level features, so these may be called high-level feature maps), but only a part or detail of these (e.g. a head or an ear) can be recognized at higher resolution levels (the feature maps on these levels typically comprise lower-level features, so these feature maps may be called low-level feature maps).

The feature extractor is preferably pretrained to advantageously achieve better results and to avoid overfitting. For example, many different pets and other characteristic objects are taught (pretrained) to the machine learning (neural network based) components of the apparatus and the respective method. With appropriate pretraining, higher efficiency can be achieved in the recognition of objects (see below for details illustrated by the help of examples of disparity analysis).

In the pretraining/training process a loss value (error-like quantity) is generated with an appropriate loss function. In the training process a loss value is preferably generated on the output of the last displacement refinement unit (i.e. to the output of that one which outputs the final displacement maps when the apparatus is not trained but used for generating displacement maps; this is e.g. a disparity refinement unit). Loss functions are preferably applied also at other layers of the neural network. The plurality of loss functions can be considered to a single one because the loss functions are summed up. Loss functions can be put on the output of all of the displacement unit and at least one displacement refinement unit (in the refinement steps of the example, to the ¹⁄₃₂, ¹⁄₁₆, ⅛ and ¼ scales compared to the starting image). With the application of loss functions on these, a reasonable displacement map can be achieved at all of the levels.

Furthermore, pre-training and training are typically two separate phases, in which the task to be performed and the data, as well as the architecture of the network and the loss functions applied may be different. Moreover, pretraining may comprise a plurality of phases, where the network is trained on successively more specific tasks (e.g. ImageNet-→synthetic data→real data→real data on a more specific domain; any phase of these can be skipped, any task may be applied for learning for which appropriate data is available, which is easier to teach, or from which better/more diverse feature capturing is expectable).

In an example, displacement is not taught in the pretraining phase, therefore, different loss functions have to be used. When pretraining is finished, all parts of the network which were used in pretraining but not in displacement map generation (if any, typically, the last one or two layers may be such) are left out when commencing the displacement map training phase. The layers necessary for displacement map generation but not for pretraining are then put on the network, and the weights of these new layers are somehow initialized. This allows the network to be taught partially or totally on a new task (in our case displacement map generation) or in a new manner.

In an example, in case of pretraining with ImageNet a classification portion to be dropped later is arranged at the end of the network, the task of which is to classify the images into appropriate categories (e.g. classification of objects: bulldog, Saint Bernard dog, cat, table). Consequently, in this variant, filters with better differentiation properties are achieved. The classification portion (the end of the network) is eliminated afterwards since no classification is to be performed explicitly in the main task, only in pretraining.

Also, such pretraining may also be applied (alone or as a second phase after ImageNet learning) in which displacement is taught using the same architecture but in a different way and/or on different data. This is advantageous since large amount of synthetic data can be generated in a comparatively cheap way from the aspect of computational costs. Moreover, a perfect ground truth displacement map (e.g. disparity or optical flow) can be generated for the synthetic data, thus, it is better to teach with these. However, a network taught on synthetic data does not reach the same quality in case of real images. Therefore, training on real data is also necessary. This latter may also be some kind of pretraining, if e.g. a huge amount of stereo image pairs might be available from a somehow different environment (then, these are applied for pretraining, but we may have fewer teaching images from the real target domain (these are then reserved for training). This is the case in an example when the objective is to achieve good results on KITTI benchmark, but only a few teaching data are available from this environment.

The loss function is typically backpropagated in the apparatus to fine tune the machine learning (neural network) components, but any other training algorithm can be used in place of backpropagation. In a supervised approach of displacement (e.g. disparity) generation, the resultant displacement map (and the calculated depth values) may be compared to e.g. LIDAR data; there is no need for such data in self-supervised or unsupervised approaches.

We now turn to the question of channel dimensions in connection with the feature map hierarchy. Performing a convolution typically increases the feature channel dimension (which is initially e.g. three for an RGB image). The increment of the channel dimension is illustrated in FIG. 1 by the thickness of the objects illustrating the starting image and feature maps. Typical channel number at 1/32 scale is 1024 to 2048.

It is emphasized that FIG. 1 is only an illustration of a convolutional neural network based feature extractor branch. Any other layer configuration can be used, with any kind of learnable convolutional layers, pooling layers and various nonlinearities. It can also include multiple computational paths that can be combined later (for example GoogleNet variants, or skip connections in case of ResNet. The applicable layer configurations have two things in common: 1. they can learn transformations on the input, 2. they have feature outputs, typically at multiple scales (a base feature map being at the bottom of the feature map hierarchy and at least one—typically more—intermediate feature map). We may also call the feature extractor network as "base network".

To summarize the above, an image $10a$ is used as an input of the feature extractor branch $15$. Feature map $10b$ is a first feature map in the illustrated exemplary feature map hierarchy, in which further feature maps $10c$, $10d$, $10e$ are comprised.

In FIG. 1 a convolution $14a$ with an exemplary convolution input $12a$ is applied on the starting image $10a$ (which is one of the images of a stereo image pair) and a convolution output $16a$ (being the output of the convolution $14a$) on the first feature map $10a$ are shown. The exemplary convolution $14a$ is applied to a 3×3 group of pixels (to all of the one or more channels of the starting image $10a$), and its convolution output $16a$ is a single pixel (with a specific number of channels equal to the number of channels defined by the convolution kernel, see the depth of the convolution kernel illustrating the number of channels). The specific convolution $14a$, as well as the corresponding convolution input $12a$ and convolution output $16a$ constitute only an illustrative example, the kernel of the convolution is moved across the whole image (for the sequence of feature maps, across the whole feature map) according to prescribed rules. Naturally, the size of the kernel can be different, or other parameters can be different. For the feature maps $10b$-$10e$, further exemplary convolutions $14b$, $14c$, $14d$ are illustrated in FIG. 1 with convolution inputs $12b$, $12c$, $12d$ and convolution outputs $16b$, $16c$, $16d$.

The method and apparatus according to the invention are suitable (adapted) for generating a displacement map of a first input dataset and a second input dataset of an input dataset pair (in the example of FIG. 2, the displacement map is a disparity map of a left image $20a$ and a right image $30a$ of a stereo image pair; the members of the investigated pair are, of course, somehow correlated), each input dataset has at least one spatial dimension and/or time dimension. According to the invention a displacement map (i.e. at least one) is generated. As illustrated in the figures, an embodiment of the invention is a hierarchical feature matching method and apparatus for stereo depth estimation (based on a disparity map). Due to the relatively low calculation costs and effectiveness, the method and apparatus according to the invention is advantageously fast. Thus, the method and apparatus according to the invention are adapted for predicting a displacement map (e.g. a disparity map from stereo image pairs) using neural network. The method and apparatus according to the invention are robust for small errors in camera calibration and rectification, and perform well on non-textured areas.

The steps of the method according to the invention in an embodiment are given in the following (illustrated by the example of FIG. 2).

In a first step, the first input dataset and the second input dataset (the notions "first" and "second" in the name of the input dataset do not mean an order of the input datasets, of course; the role of the notions is only to show the difference between the two input datasets; these are the left image $20a$ and the right image $30a$ in the example of FIG. 2) are processed by means of a neural network based feature extractor $25$ (may also be called simply a neural (network) feature extractor or a feature extractor using neural network; comprising in the present embodiment two branches $27$ and $29$) so as to generate a feature map hierarchy $50$ comprising a base pair of feature maps (feature maps $20e$ and $30e$ in the example of FIG. 2; typically the coarsest feature maps) and a refinement pair of feature maps (feature maps $20b$-$20d$ and $30b$-$30d$ in FIG. 2, typically the next-coarsest and even less coarser feature maps; the feature maps are preferably successively produced by means of the feature extractor), each pair of feature maps constituting one level of the feature map hierarchy $50$, the refinement pair of feature maps having less coarse resolution in all of their at least one spatial dimension and/or time dimension than the base pair of feature maps. Accordingly, the feature map hierarchy comprises at least two pairs of feature maps (one base pair or feature maps and at least one refinement pair of feature maps).

Thus, one or more refinement pair of feature maps may be comprised in the feature map hierarchy. In the following, the method according to the invention is described for one refinement pair (which can be the only one, or, more preferably, one selected from a plurality of refinement pairs of feature maps as illustrated in FIG. 2). Until we turn to the case of having a plurality of (i.e. at least two) refinement pair of feature maps, we refer to this single (only or selected) refinement pair of feature maps.

Calling these pairs "base" and "refinement" is not restrictive, any other name could be used for these pairs (e.g. first, second, etc.). In the illustrated example of FIG. 2, coarser and coarser resolution is obtained since the feature map is gradually downscaled. Therefore, each successive pair of feature maps are preferably downscaled relative to the pair of feature maps of the previous level of the feature map hierarchy 50.

Thus, in the above step the hierarchical series (sequence) of feature maps called feature map hierarchy is generated. In other words, the neural network based feature extractor produces feature maps of multiple scales. Accordingly, the number of feature map levels is at least two; i.e. a displacement unit and at least one displacement refinement unit (e.g. a disparity unit and at least one disparity refinement unit) are comprised in the apparatus according to the invention. Throughout the present description, the disparity is the main example for the displacement. The number of feature map levels is preferably between 2 and 10, in particular between 3 and 8, more preferably between 3 and 5 (and 4 in the example of FIG. 2). The feature map hierarchy comprises feature map pairs, i.e. there is a "sub-hierarchy" of feature maps corresponding to each of the first input dataset (e.g. left image) and the second input dataset (e.g. right image), i.e. the hierarchy has two branches); the feature maps from the sub-hierarchies which constitute a pair on a certain level of the feature map hierarchy have the same image size and resolution (pixel number). Accordingly, both hierarchy branches give a contribution to the pair of feature maps in a level; in other words, a level extends into the two branches of the hierarchy. To sum up, the feature map hierarchy is a feature map collection (feature map set) having a plurality of levels with a pair of feature maps in each of the levels; the word "hierarchy" in the name describes that this feature map set has coarser and coarser feature maps on its levels.

Calling the members of the input dataset pair (of the stereo image pair) left and right images in the example of FIG. 2 would illustrate that these are recorded from different viewpoints, since a left and a right image of a stereo pair can be always defined. Left and right images may be called also simply first and second images, or e.g. first-side and second-side images, respectively (these considerations of left and right applies also of differentiations of feature maps, sub-units of the disparity (refinement) unit, etc.). FIG. 1 illustrates a single feature extractor branch 15. In FIG. 2 the block diagram of an embodiment of the method and apparatus according to the invention is shown. In the embodiment of FIG. 2 a neural network based feature extractor 25 having two feature extractor branches 27 and 29 (a separated branch for each of the left and right images) on the left and the right side of FIG. 2, respectively, is utilized.

According to the above description, a level called previous is a higher level according to FIG. 2 (being in a higher position in the figure). Thus, the feature maps of a "present" (or presently investigated/handled) level are downscaled relative to feature maps of a higher level. The predetermined amount applied for the scaling can be a freely selected (integer) number. This scaling factor is not necessarily the same throughout the hierarchy, for example factors of two and four are applied in the illustrative example of FIG. 2. Also, other scaling factors can be used, in particular powers of two. Upscaling factors applied by the refinement of the displacement (e.g. disparity) map have to be in correspondence with these scaling factors. All of the scaling factors could be two, but it would cause a much slower performance (longer runtime), and it would not yield much more in accuracy. Applying a scaling factor of two on an image, the area of the scaled image becomes one-fourth of the original. Thus, if the runtime is 100% in the original image, it is 25% in an image scaled by a factor of two, and it is 6.25% in an image scaled by a factor of four. Accordingly, runtime can be highly decreased if a scaling factor of four is applied at the beginning of the procedure, and a scaling factor of two for the remaining scalings, instead of using a scaling factor of two in the whole scaling procedure. Accordingly, different scaling factors may be applied between each of the level pairs, but it is also conceivable to use the same scaling factor on all levels.

Feature maps of a "present" level always have a coarser resolution (lower pixel number) than the previous level, and,—as illustrated in FIG. 2—preferably, higher number of feature map channels. In the figure, the channel number of a feature map is illustrated by the thickness of a feature map. The preferred increasing number of channels is in correspondence by the fact that in a feature map of the "present" level the picture information of the original images (left image and right image) is most cases more processed than in the previous level. The number of channels is also in correspondence with the different features to be investigated. In some cases, it is not worth to increase the number of channels too high; consequently, the number of channels may even be the same for two consecutive levels. Accordingly, in the preferred case the "present" level feature maps contain fewer remaining picture like information and their information structure become more similar to final feature maps (with the lowest resolution, i.e. these are typically the coarsest feature maps) than the feature maps of the previous level (the "present" level feature map is more "feature map like"). Moreover, at a deeper and deeper level (with coarser and coarser feature map) in the neural network, higher and higher-level features are recognized. For example, at the starting levels only some basic objects (e.g. lines, patches) can be differentiated, but deeper at the hierarchy many different objects can be recognized (e.g. humans, vehicles, etc.). Since the information storing capability is to be maintained, the channel number has to be increased when decreasing feature map/image size.

After that, in a next step, an initial displacement map is generated (in the embodiment of FIG. 2 disparity maps, namely left and right disparity maps 46e, 48e are calculated, i.e. not only one but two initial disparity maps) in a displacement (e.g. disparity) generating operation for the base pair of feature maps of the feature map hierarchy 50 based on matching a first feature map of the base pair of feature maps with a second feature map of the base pair of feature maps. The base pair of the feature maps is the pair of the feature maps 20e and 30e in the illustration of FIG. 2; these are the coarsest feature maps in the illustrated hierarchy, since the hierarchy comprises feature maps with coarser and coarser resolution on the levels starting from the images 20a and 30a. Accordingly, an initial displacement map is generated for the base (typically last, lowest resolution, coarsest) pair of feature maps. This initial displacement map (e.g. disparity map) is a low resolution one, its resolution is to be increased for having a final displacement map (i.e. in the example of FIG. 2, a disparity map which can be appropriately used as the output for a stereo image).

Figure 6:
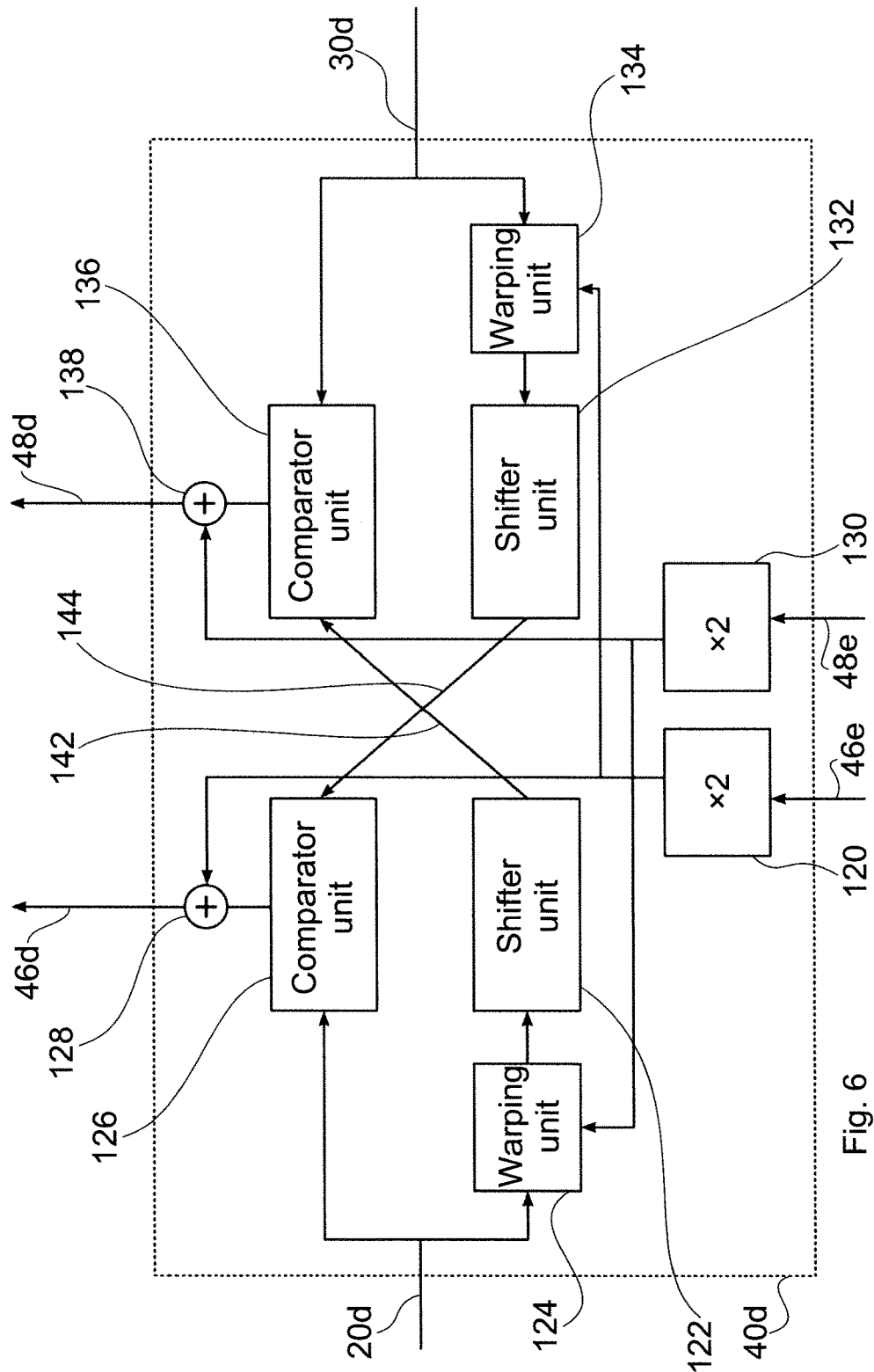
FIG. 6 shows the block diagram of an embodiment of the disparity refinement unit.

Furthermore, in a step corresponding to a displacement refinement operation, the initial displacement map (e.g. disparity map) is upscaled in all of its at least one spatial dimension and/or time dimension to the scale of the refinement pair of feature maps (feature maps 20d, 30d in the illustration, see the description of FIG. 6 for details) of the feature map hierarchy (feature map hierarchy 50 in the illustration) with a respective upscaling factor (i.e. with which the initial displacement map can be upscaled to the scale of the appropriate refinement pair of feature maps) and the values of the initial displacement map are multiplied with the respective upscaling factor to generate an upscaled initial displacement map (feature maps and displacement [e.g. disparity] maps have the same spatial and/or time dimensions as the input datasets, but these typically have different resolution), then a warped version of the first feature map of the refinement pair of feature maps is generated by carrying out a warping operation using the upscaled initial displacement map on a first feature map of the refinement pair of feature maps (feature maps 20d, 30d in the illustration) of the feature map hierarchy 50. Accordingly, in the upscaling step the respective dimensions of the displacement map are enlarged (e.g. by an upscaling with a factor of two, in an upscaling step, the distances between two pixels become twice as large as they were) and the values of the displacement map are multiplied by the upscaling factor (since the distances will be larger in the upscaled disparity map), see below for details in an embodiment.

An exemplary realization of the warping operation will be described in detail below in connection with FIG. 6. In a nutshell, the previous displacement (e.g. disparity) map is applied on one side feature maps from different levels of the hierarchy to have a well-behaving input for comparison with the other side feature map. In other words, the warping operation shifts the feature map on a pixel-by-pixel basis by the values of the displacement (e.g. disparity) map. Therefore, the warped version of a feature map will be much "closer" to the other feature map to which it is to be compared (the displacement [e.g. disparity] calculated for a coarser level is itself an approximation for the shifts by the help of which one feature map can be transformed into the other feature map of the pair on a level). Thus, by the help of warping, an approximation for the other feature map of a pair is obtained (this was called well-behaving input above). When this approximation is compared to the other feature map of the pair itself, correction to the (approximate) previous displacement (e.g. disparity) can be obtained. This warping operation allows for applying only a more limited set of shifting when seeking the appropriate displacement (e.g. disparity) refinement in a certain level displacement refinement unit (see the description of FIG. 6 for details). The displacement map (e.g. disparity) typically has channels (which are termed coordinate channels in the present document) corresponding to spatial or time dimensions of the input or a feature map (or may have less coordinate channels in case of a restriction). When a displacement map is applied on a feature map, then the displacement values stored in the coordinate channels of the displacement map are applied as shifting offsets for each of the pixels of the feature map. This shift operation is performed independently for all the feature channels of the feature map, without mixing these feature channels with each other.

In the context of the present document, the above defined definition is used for warping. In other approaches, this step may be called pre-warping, and, at the same time, the word warping may be used for other operations.

Next, the warped version of the first feature map of the refinement pair of feature maps is matched with the second feature map of the refinement pair of feature maps so as to obtain a correction displacement map for the warped version of the first feature map of the refinement pair of feature maps and the second feature map of the refinement pair of feature maps (this displacement [e.g. disparity] map is only a correction for the coarser displacement map due to the conditioning with the warping operation, see below for details), which correction displacement map is added to the upscaled initial displacement map so as to obtain an updated displacement map (for the refinement pair of feature maps, i.e. typically for the next level, the left and right disparity maps 46d, 48d in the example of FIG. 2, when this step is performed for the first time).

Thus, in the above step using the reference signs of FIG. 2 (discussing disparity map as a special case of the displacement map), the feature map pair of a next level is utilized to make corrections on the disparity map which is already at hand (this is the initial disparity map for the disparity refinement unit 40d, lowest in FIG. 2). In other words, in the at least one disparity refinement unit a respective hierarchical structure of comparators refines the previous detection. The aim is to increase resolution and accuracy of the disparity (and, in general, displacement) map. This done by means of displacement refinement units (e.g. disparity refinement units) in the apparatus according to the invention, and, therefore, preferably also in the method according to the invention. The next-coarsest pair (as an exemplary refinement pair) of feature maps has a higher resolution (higher pixel number) than the coarsest pair (as a good candidate for a base pair) of feature maps. Accordingly, a higher resolution correction can be obtained for the disparity map based on this data. Therefore, before adding (combining) the initial disparity map and the disparity map correction obtained based on the feature maps (called correction disparity map above), the size of the initial disparity map is upscaled. The upscaling is performed by a factor of two in the example of FIG. 2, since there is a scaling of two between the coarsest feature maps and the next coarsest feature maps. Thus, generally speaking for every level, before the addition in each level, the disparity map of the previous level is upscaled by the scaling factor between the feature maps of the previous and the present level. For the details of upscaling in the illustrated embodiment, see also FIG. 6. The addition of different disparity maps means adding them to each other on a "pixel-by-pixel" (more generally, on a data element-by-data element) basis; therefore, disparity (in general displacement) values in the pixels are added up or in case of generalized disparity vector addition of disparity vectors (in general these are performed on displacement vector) is performed in this step.

In the above steps, matching of two feature maps is performed. Matching is a comparison of two feature maps (in displacement/disparity refinement operations one them is warped) based on which the displacement (e.g. disparity) map of the two feature maps can be obtained (generated). In other words, in a matching operation displacement (e.g. disparity) is calculated based on two feature maps. In the illustrated embodiments matching is performed by applying shifting values (for generating a plurality of shifted versions of a feature map), as well as the comparison is performed with considering the plurality of shifted versions. This approach of matching is described below in details, especially in connection with FIGS. 3 and 6.

Above, the basic building block of the invention is detailed, i.e. the correspondence between a base pair of feature maps and a refinement pair of feature maps. In a general case the refinement pair of feature maps mentioned above is the only one or the one which is the closest to the base pair of feature maps (see below for details). The typical case of having more than one refinement pairs of feature maps is detailed herebelow.

Thus, in a preferred embodiment (as in the illustrated embodiment of FIG. 2), at least two (a plurality of) refinement pairs of feature maps (pairs of feature maps 20b, 30b, 20c, 30c, 20d, 30d in the example of FIG. 2) are comprised in the feature map hierarchy (having reference number 50 in the example of FIG. 2). In other words, the case of having a plurality of refinement pairs of feature maps is described in the following. To have more than one refinement pairs of feature maps is advantageous, because in this embodiment the refinement of the displacement map is performed in multiple stages, and a displacement map with better resolution can be obtained.

In this embodiment, a first refinement pair of feature maps (the pair of feature maps 20d, 30d in the example of FIG. 2) being closest to the base pair of feature maps (the pair of feature maps 20e, 30e in the example of FIG. 2) in the feature map hierarchy have a less coarse resolution than the base pair of feature maps, and each successive refinement pair of feature maps (the pair of feature maps 20b, 30b, 20c, 30c in the example of FIG. 2) being less close to the base pair of feature maps in the feature map hierarchy than the first refinement pair of feature maps have a less coarse resolution than a neighbouring refinement pair of feature maps being closer to the base pair of feature maps in the feature map hierarchy than the respective successive refinement pair of feature maps.

Furthermore, in the present embodiment, the displacement (e.g. disparity) refinement operation (this is the first displacement refinement operation introduced above) is performed using the first refinement pair of feature maps and a respective further displacement refinement operation is performed for each successive refinement pair of feature maps, wherein in each further displacement refinement operation the updated displacement map obtained for the neighbouring refinement pair of feature maps being closer to the base pair of feature maps in the feature map hierarchy than the respective successive refinement pair of feature maps is used as the initial displacement map being upscaled, during the upscaling in the respective displacement refinement operation, to the scale of the respective successive refinement pair of feature maps with a respective upscaling factor (i.e. with which the initial displacement map can be upscaled to the scale of the appropriate [next] refinement pair of feature maps) and the values of the updated initial displacement map are multiplied with the respective upscaling factor.

Using the reference numbers of FIG. 2 and the content of the illustrated embodiment, refinement of the disparity map is performed for each subsequent level (subsequent counting from the lowest, i.e. coarsest disparity level, the resolution is higher and higher in higher and higher disparity levels in FIG. 2), if there are one or more subsequent levels. As mentioned above, the invention also covers the case when the feature extractor has two levels (i.e. there are two levels of feature maps besides the level of the input images, namely one level with a base pair of feature maps and one level with a refinement pair of feature maps) to which a disparity unit and a disparity refinement unit correspond in the disparity hierarchy suitable for obtaining a disparity map for an image pair of a stereo image. In fact, having further intermediate levels in the hierarchy (between the input datasets and the level of the base feature maps) can lead to better performance. If more levels are applied, the resultant disparity map is reached in more refinement steps with smaller jumps in the size of the disparity map. Accordingly, the corresponding feature map sequence has more feature map levels applied for the refinement.

A further disparity refinement unit may be applied compared to the example of FIG. 2, i.e. such a unit can be applicable with the original images (left and right images) as inputs for disparity refinement. However, calculation-costs of such a further disparity refinement unit are high (also means longer runtime), so it may be preferred to skip it. The case (such as the illustrated case) when no such additional disparity refinement unit is applied does not yield a considerable disadvantage. Thus, from the view of efficiency it is straightforward to leave out the disparity refinement unit from the level of the analysed images. Therefore, depending on the structure of disparity refinement units, the method arrives to the final disparity map after processing the least coarse pair of feature maps, or, alternatively, after processing also the starting images themselves.

To sum up, in the approach according to the invention, a plurality of different level feature maps is generated by means of a neural network based feature extractor. Besides, during the displacement (e.g. disparity) analysis, different levels of displacement are generated based on the hierarchical levels of feature maps by means of displacement units and displacement refinement units. As a consequence, the total number of feature map levels and the level of the starting image is equal or larger than the total number of the displacement unit and the at least one displacement refinement unit (e.g. disparity unit and at least one disparity refinement unit; every unit operates on a respective single feature map level). In the example of FIG. 2, the first number is larger (it is five, the number of the units is four). In the example the number of feature map levels is equal to the number of units.

However, such feature map levels may also be arranged which are not processed by a displacement (refinement) unit, i.e. which are not a base pair or a refinement pair of feature maps, but such pairs which are not processed by the displacement (refinement) units. Accordingly, additional levels with coarser resolutions than the base pair of feature maps are also conceivable. In other words, all of the disparity (refinement) units have a respective pair of feature maps which can be processed by the respective units as an input.

According to the above details, in an embodiment, the input dataset pair is a pair of images of a stereo image, the displacement map is a disparity map, the displacement generating operation is a disparity generating operation and the displacement refinement operation is a disparity refinement operation.

In general, according to the invention there is at least one feature map (may be called intermediate) between the base feature map being the last one in the hierarchy and the image under analysis.

As clear from the above details, in an embodiment, the feature maps have one or more feature channels, and in the displacement (e.g. disparity) generating operation and/or in the displacement (e.g. disparity) refinement operation, the matching is performed by taking into account the one or more feature channels of the feature maps (see FIG. 5A, where all C channels are taken into account in the convolution of the comparator, i.e. in the matching), and an initial displacement (e.g. disparity) map having and a correction displacement (e.g. disparity) map are generated, respectively, with the same or less number of coordinate channels than the number of the at least one spatial dimension and/or time dimension of the input datasets (these have the same dimensions).

Also, as illustrated, in the embodiment of FIG. 2, a pair of a left initial disparity map 46e and a right initial disparity map 48e is generated in the disparity generating operation, and, based on the pair of a left initial disparity map and a right initial disparity map and a pair of a left correction disparity map and a right correction disparity map generated in the disparity refinement operation, a pair of a left updated disparity map and a right updated disparity map is generated in the disparity refinement operation (the updated disparity map serves as initial disparity map for the next level). More generally, a pair of a first initial displacement map and a second initial displacement map is generated in the displacement generating operation, and based on the pair of the first initial displacement map and the second initial displacement map and a pair of a first correction displacement map and a second correction displacement map generated in the displacement refinement operation, a pair of a first updated displacement map and a second updated displacement map is generated in the displacement refinement operation.

Figure 3:
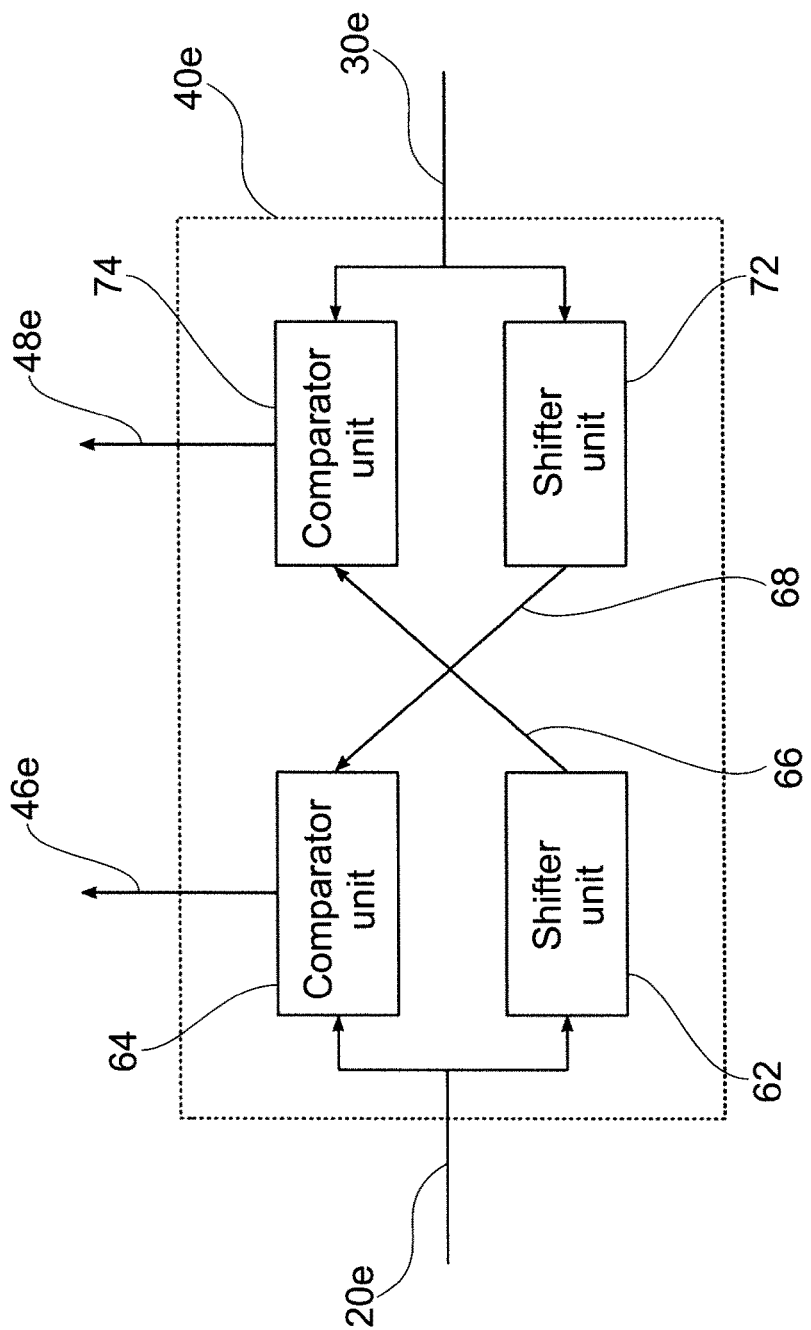
FIG. 3 shows the block diagram of the disparity unit in an embodiment.

Some embodiments of the invention relate to an apparatus for generating a displacement map of a first input dataset and a second input dataset of an input dataset pair (the apparatus is suitable for generating a disparity map of a left image and a right image of a stereo image pair, in the example of FIG. 2), each input dataset having at least one spatial dimension and/or time dimension. An embodiment of the apparatus is also illustrated by FIG. 2. The apparatus is adapted for performing the steps of the method according to the invention. The apparatus according to the invention comprises in an embodiment (illustrated by the help of the example of FIG. 2)

a neural network based feature extractor 25 being adapted for processing the first input dataset and the second input dataset (the left image 20a and the right image 30a in the example of FIG. 2) so as to generate a feature map hierarchy 50 comprising a base pair of feature maps and a refinement pair of feature maps (see above for the pairs of feature maps, left and right feature maps on the same level in FIG. 2), each pair of feature maps constituting one level of the feature map hierarchy 50, the refinement pair of feature maps having less coarse resolution in all of their at least one spatial dimension and/or time dimension than the base pair of feature maps;
  a displacement unit (it is specifically a disparity unit 40e in the example of FIG. 2) comprising a first comparator unit (first comparator units 64, 74 are shown in FIG. 3 in an embodiment) adapted for matching a first feature map of the base pair of feature maps with a second feature map of the base pair of feature maps (feature maps 20e and 30e are the member of the base pair in FIG. 2) so as to generate an initial displacement map (an initial disparity map in the embodiment of FIG. 2, namely left and right disparity maps 46e, 48e, as detailed above) for the base pair of feature maps of the feature map hierarchy 50;
  a displacement refinement unit (it is specifically a disparity refinement unit in the example of FIG. 2; in FIG. 2, three disparity refinement units are shown, namely, disparity refinement units 40b, 40c, 40d) comprising
    an upscaling unit (in the embodiment of FIG. 6 upscaling units 120 and 130, see below for details) adapted for upscaling the initial displacement map in all of its at least one spatial dimension and/or time dimension to the scale of the refinement pair of feature maps (feature maps 20d, 30d in the example of FIG. 2) of the feature map hierarchy 50 with a respective upscaling factor and adapted for multiplying the values of the initial displacement map the respective upscaling factor to generate an upscaled initial displacement map,
    a warping unit (see FIG. 6 for warping units 124, 134 in an embodiment) adapted for generating, by carrying out a warping operation using the upscaled initial displacement map on a first feature map of the refinement pair of feature maps (in FIG. 2 feature maps 20d, 30d are the members of the refinement pair used for scaling the initial disparity map) of the feature map hierarchy 50, a warped version of the first feature map of the refinement pair of feature maps,
    a second comparator unit (see the embodiment of FIG. 6 for second comparator units 126, 136; first and second comparator units may have the same structure, e.g. the structure illustrated in FIG. 5A with the possible choices shown in FIG. 5B) adapted for matching the warped version of the first feature map of the refinement pair of feature maps with a second feature map of the refinement pair of feature maps so as to obtain a correction displacement map for the warped version of the first feature map of the refinement pair of feature maps and the second feature map of the refinement pair of feature maps, and
    an addition unit (see addition units 128, 138 in the embodiment of FIG. 6) adapted for adding the correction displacement map and the upscaled initial displacement map so as to obtain an updated displacement map (for the refinement pair of feature maps).

In a preferred embodiment (see e.g. the embodiment of FIG. 2 specialized for disparity generation), as mentioned above, the apparatus comprises at least one further displacement refinement unit (upon the displacement refinement unit introduced above; see for the special case of disparity the plurality of disparity refinement units 40b-40d in FIG. 2), and at least two refinement pairs of feature maps (refinement pairs of feature maps 20b, 30b, 20c, 30c, 20d, 30d in the example of FIG. 2) are comprised in the feature map hierarchy, wherein a first refinement pair of feature maps (pair of feature maps 20d, 30d in the example of FIG. 2) being closest to the base pair of feature maps (pair of feature maps 20e, 30e in the example of FIG. 2) in the feature map hierarchy has a less coarse resolution than the base pair of feature maps, and each successive refinement pair of feature maps being less close to the base pair of feature maps in the feature map hierarchy than the first refinement pair of feature maps has a less coarse resolution than a neighbouring refinement pair of feature maps being closer to the base pair of feature maps in the feature map hierarchy than the respective successive refinement pair of feature maps.

Furthermore, in this embodiment the displacement refinement unit is applied on the first refinement pair of feature maps and a respective further displacement refinement unit is applied on each successive refinement pair of feature maps, wherein in each further displacement refinement unit the updated displacement map obtained for the neighbouring refinement pair of feature maps being closer to the base pair of feature maps in the feature map hierarchy than the respective successive refinement pair of feature maps is used as the initial displacement map being upscaled, during the upscaling in the respective displacement refinement operation, to the scale of the respective successive refinement pair of feature maps with a respective upscaling factor and the values of the updated displacement map are multiplied with the respective upscaling factor.

Regarding the prior art approaches, some of them apply neural network based feature extraction (CN 105956597 A, Kendall, Zhong, Mayer, Fischer, Pang, Godard), but the structure for disparity (in general, displacement) refinement applied according to the invention is not disclosed in any of them. In other words, the structure applied in the invention, wherein the intermediate level feature maps (one of them is warped) are utilized in the sequence responsible for displacement (e.g. disparity) refinement, is not disclosed and cannot be derived from the above cited prior art.

From the above mentioned articles, Mayer applies the approach of Fischer for disparity estimation. In Fischer, a neural network based approach is applied for optical flow (flow from a time 't' to time 't+1'). Fischer applies a correlation operation at a relatively early stage [less coarse, relatively high resolution] level of feature hierarchy (this is the only comparison of the feature maps in this approach) i.e. only feature maps from these levels are calculated for both of the images. No hierarchic refinement using feature map pairs is applied in this approach.

In Kendall, a neural network based feature extractor is utilized for stereo images. In the approach downsampling and upsampling are applied one after the other. In Kendall—unlike in the invention—disparity values are regressed from the cost volume using a so-called "soft argmin" operation. In the Kendall approach a cost volume is generated in which the reference and the other feature map transformed with all possible disparity values are concatenated. Accordingly, in this approach the reference is always the first level, and since they apply 3×3×3 kernels, the reference has only influence on the consecutive two levels when this kernel is, which have been concatenated on the reference. Therefore, disadvantageously all the other levels do not "see" the reference.

The approach of Zhong is very similar to Kendall. In this approach a feature volume is generated. One of the feature maps is selected as a reference, and different disparity values are applied on the other feature map. In the feature volume obtained by concatenation a transformed feature map is sandwiched between two references. This approach is disadvantageously complicated and the calculation costs are high.

Moreover, in contrast to the approach of Kendall and Zhong, such an approach is applied in certain embodiments of the invention (see FIGS. 5A and 5B), in which—according to the structure of the comparator—the result is equivalent as if the differently shifted feature maps would be compared one by one to the reference. Additionally, thanks to the constructional details of the comparator unit, the approach applied in this embodiment of the invention is very advantageous from the aspect of calculation-costs. See the description of FIGS. 5A and 5B below for details.

Pang discloses a framework for disparity analysis, which is highly different from the invention. In the approach of Pang, a first neural network produces a coarse disparity map, which is refined by a second neural network in a way being different from the approach of the invention. In contrast, a high resolution disparity map can be obtained in the framework invention by the help of the hierarchically applied disparity refinement units. In the approach of Pang the interim results are not used for the prediction on the next level, since the interim results are summed up only at a final stage. In contrast, in the approach of the invention, the interim result is applied for warping, accordingly, the calculation costs of the consecutive level decrease.

In Godard no hierarchic disparity refinement is applied. In this approach the loss is investigated on multiple levels to control the training procedure at several points of the procedure. Only one of the camera images (e.g. the left) is processed by the neural network in this approach, i.e. the hierarchy of left-right feature maps is not generated.

In WO 00/27131 A1 no machine learning or neural network based approach is applied. Therefore, no transformation to feature space is applied in this prior art document. Instead convolutions with predefined filters are applied in the approach of the document. In other words, features are not investigated in WO 00/27131 A1 (it is not necessary since the disparity basically characterizes an image). Disadvantageously, in contrast to the invention, the approach of WO 00/27131 A1 is not concentrated on the relevant features. However, matching can be performed more effectively on the basis of features. E.g. in case more same colour patches are situated in the images of the stereo image pair it is harder to make correspondence between these in the image space (i.e. based on colours) than in the feature space (i.e. based on semantic content). To sum up, feature based matching applied in the invention is more advantageous, since the disparity has to be accurate for those areas where relevant features are situated. We have identified that from the point of view of the features, the low resolution of the base feature maps is not disadvantageous since the presence of a feature can also be retrieved at low resolution (the feature maps have much richer content at lower resolutions, have more and more feature like properties, see above). This is in contrast to the approach of WO 00/27131 A1, where the low resolution levels comprise much less information. Moreover, in the approach of WO 00/27131 A1 the same content is compared at different resolutions.

To summarize, in the known approaches the hierarchic refinement of the displacement map (e.g. disparity map) does not appear in such a way like in the invention, i.e. that on a given level a previous, coarser displacement map is refined by the help of the feature maps of that level.

FIG. 2 shows the high-level architecture of an embodiment of approach of the invention. The corresponding pairs of feature maps are constituted in the illustrated exemplary embodiment by feature maps 20*b* and 30*b*, 20*c* and 30*c*, 20*d* and 30*d*, as well as 20*e* and 30*e*. In the illustrated exemplary embodiment, the same convolutional neural network (CNN) is applied to both of the left image and right image of the stereo pair (they can be processed as a 2-element batch, or with two separate CNNs having shared filters). In many cases, the neural network is implemented in a way that more images can be processed by it at the same time; these are processed in a parallel way, and at the end feature maps for every image can be obtained. This approach yields the same result as if the neural network would be copied, and one of the neural networks would process the left image and the other would process the right image.

Naturally, the members of the feature map pairs have the same size (i.e. the same spatial dimensions as denoted in FIG. 2, H/4×W/4, H/8×W/8, etc.) and the same number of feature channels (illustrated by the thickness of each member of the pair).

The extracted features are fed to units that generate (disparity unit 40*e*) or refine (disparity refinement units 40*d*, 40*c*, 40*b*) disparity (in general, displacement) images. The units applied in the present documents can also be called modules.

As illustrated in FIG. 2, disparity is firstly calculated at the base (typically coarsest) scale (for the base pair of feature maps, i.e. for feature maps 20e and 30e), and refinement units are used to upscale and improve these predictions. This results in a hierarchical structure as shown in FIG. 2.

In the example illustrated in FIG. 2, the outputs of the disparity unit 40e, namely coarsest (lowest in the figure, base) left disparity map 46e (having the lowest resolution from the left disparity maps) and coarsest (lowest in the figure, base) right disparity map 48e (having the lowest resolution from the right disparity maps) have a size being ⅟32-part of the input left image 20a and right image 30a. In the next two levels, the size of the disparity maps is ⅟16-part and ⅛-part thereof, respectively.

Note that the ⅟32, ⅟16, etc scales are only for demonstration. Any sequence of scales can be used, with any increment (not just 2×, see the size reduction aspects detailed above in connection with the introduction of convolution and pooling layers). The output of the last disparity refinement unit (having the reference number 40b according to FIG. 2) is the network output (disparity maps 46 and 48), i.e. the resultant disparity map obtained by the respective embodiment of the method and apparatus according to the invention (it is a pair of maps in the example). Additional zooming or convolutions may be applied to improve the results. The disparity (refinement) units also comprise learnable convolutions (in other words, units performing convolution or, simply, convolution units, see FIGS. 4-6 below), so they should be trained how to perform their task.

Note that the system of units applied in the invention (feature extractor, displacement/disparity [refinement] units) is preferably fully differentiable and the system of units is learnable end to end. All displacement (refinement) units can then pass gradients backwards, so they behave like ordinary CNN layers. This helps in learning just the right (i.e. appropriate) features for the task. CNNs can be pretrained on the commonly used ImageNet (see Olga Russakovsky et al.: ImageNet Large Scale Visual Recognition Challenge, 2014, arXiv: 1409.0575) or on any other appropriate task, or can be used without pretraining (by only applying a training phase). The utilized network can be taught in either supervised or unsupervised way. In the supervised approach, input images and output displacement (e.g. disparity) maps are presented to the network. Since dense displacement/disparity maps of the real world are very difficult to acquire, these are typically simulated data. In the unsupervised approach, the network output is used to warp left image to right and right image to left. Then they are compared to the real images, and the loss is approximated based how well they match. Additional loss components can be added to improve the results (see above for details).

In FIG. 3 the flow chart of the disparity unit 40e in an embodiment is shown (in an approach this is the unit (module) which is first applied to the feature maps in the hierarchy, at the same time, the lowest in the figure). It receives from the same hierarchy level (lowest in FIG. 2) the left feature map 20e and right feature map 30e as inputs. Then, shifted versions of the feature maps 20e and 30e are generated in left shifter unit 62 and right shifter unit 72, respectively (a shifter unit can be simply called shifter, or, alternatively, shifter module), and these shifted versions are fed to respective comparator units 74 and 64 (may also be called simply comparator, or, alternatively, comparator module; there are cross-connections 66, 68 between the shifter units 62, 72 and comparator units 64, 74), which are also learnable (see below).

Accordingly, the disparity unit 40e being responsible for generating the initial disparity map (in the illustrated example, more precisely, the pair of left and right initial disparity maps) operates as follows. Starting the description of operation from the left side of FIG. 3 (the right side is equivalent), the left feature map 20e as a first input is fed both into the shifter unit 62 and into the comparator unit 64. Because of the cross-connections 66, 68, comparator unit 64 will be used to compare the shifted right feature map 30e to the left feature map 20e fed into it. The shifter unit 62 forwards the shifted versions of the left feature map 20e to a comparator unit 74 into which the right feature map 30e is fed at its right hand side. A shifter unit applies a global shift to a feature map, i.e. applies the same amount of shift to all pixels of the feature map (more shifts can be applied in a shifter unit at the same time, see the description of the following figures).

When the comparator unit 74 performs its task (i.e. the comparison to have a disparity map on its output), it compares the shifted versions of the left feature map 20e to—the unshifted version of—the right feature map. Practically, the comparator unit chooses (or interpolates, see below) the most appropriate shift for every pixel on a pixel-to-pixel basis (i.e. the shift with which the given left feature map pixel is in the best correspondence with the respective pixel of right feature map) and takes these shift values to the disparity map, again on a pixel-to-pixel basis, using for each pixel e.g. the pixel position coming from the right feature map 20e (i.e. to the not shifted feature map from the pair). Accordingly, the right disparity map comprises disparity values from the point of view of the right feature map (and consequently, the right image).

The comparator unit 64 performs the same process on the left feature map 20e and the shifted version of the right feature map 30e. It outputs left initial disparity map 46e, in which the disparity values are given from the aspect of the left feature map (left image).

Thus, in the embodiment of the method illustrated in FIG. 3, in the displacement (e.g. disparity) generating operation a plurality of shifted feature maps of the first feature map of the base pair of feature maps (feature maps 20e, 30e illustrated in FIG. 2) is generated applying a plurality of different shifts (shift/shifting value when the shifting can be given by a single number or a shift/shifting vector when the shift can be given by more than one coordinates) on the first feature map of the base pair of feature maps, and the initial displacement map (left and right disparity maps 46e, 48e in FIG. 2) is obtained by generating a resultant shift for each data element (pixel) position of the second feature map of the base pair of feature maps on the basis of investigating the matching between the plurality of shifted feature maps of the first feature map of the base pair of feature maps and the second feature map of the base pair of feature maps (accordingly based on the matching, a resultant shift, i.e. a respective shift is obtained for each pixel position giving the displacement [e.g. disparity] value corresponding to that position).

For the refinement of the displacement (e.g. disparity) maps, similar steps are taken in the embodiment illustrated in FIG. 6 (similar scheme of applying shifts is performed). Accordingly, in the displacement (e.g. disparity) refinement operation a plurality of shifted feature maps of a first feature map of the refinement pair of feature maps (feature maps 20d, 30d in FIG. 2) is generated applying a plurality of different shifts on the warped version of the first feature map of the refinement pair of feature maps, the correction displacement map is obtained by generating a resultant shift for each data element (pixel) position of a second feature map of the refinement pair of feature maps on the basis of investigating the matching between the plurality of shifted feature maps of the first feature map of the refinement pair of feature maps and the second feature map of the refinement pair of feature maps.

These embodiments, i.e. the method steps and apparatus units illustrated in FIG. 3. and FIG. 6 can be applied both separately or in combination. Thus, briefly, the shifting approach can be applied in any of the displacement unit and the at least one displacement refinement unit (accordingly, in the exemplary disparity unit and at least one disparity refinement unit).

Figure 4:
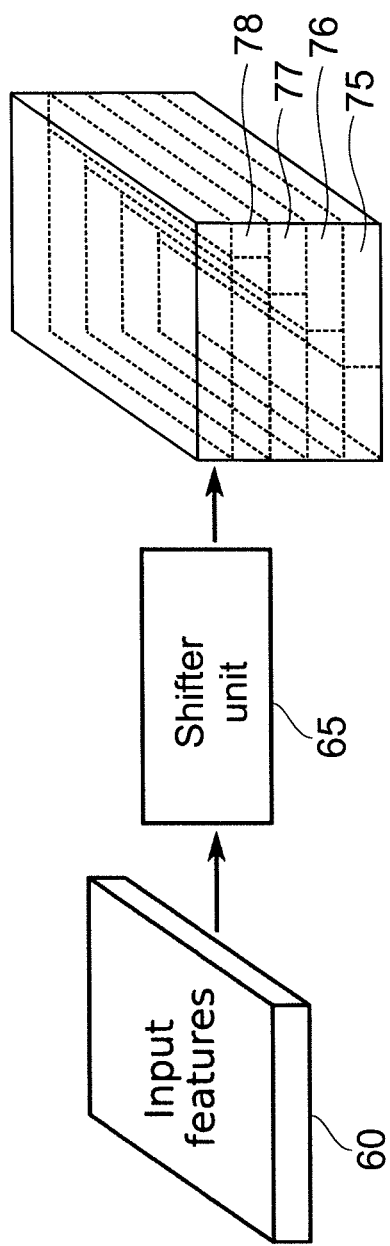
FIG. 4 is a schematic illustration of the shifting steps in an embodiment.

FIG. 4 shows an illustrative block diagram of the shifting operation (FIG. 4 is for illustration purposes; shifter units 62 and 72, and further shifter units below do the same work). In FIG. 4 a shifter unit 65 copies the input feature map 60 (labelled "input features" in the figure) to multiple locations in the output feature map. For each offset, the shifter unit 65 produces a shifted version of the input feature map (in the example of FIG. 4, resulting in shifted versions 75, 76, 77 and 78).

For each offset and location in the input feature map, the given location is translated by the given offset to yield a location within the output feature map. Then the corresponding pixel of the input feature map at the input location is copied to the output feature map at the output location. Thus, geometrically speaking, the output feature map becomes a translated version of the input feature map. There will be pixels in the output feature map at the edges whose location corresponds to no valid pixel location in the input feature map. Features at these pixels will be initialized to some predefined value which can be zero, another constant, or a learnable parameter depending only on the channel index of the feature map (e.g. for each channel, we have a constant filler value, and then if we have an output pixel that has no corresponding input pixel, then the feature vector at that pixel is initialized to the vector composed of these filler values). In case of disparity, for every different shift, the value of the horizontal shift is increased/decreased preferably by one pixel (i.e. the whole feature map shifted globally with a predetermined amount of pixels). Accordingly, the side of the map, which has no input, may be padded with zeros, or a learnable vector.

The shifter unit has a parameter, which is the range of the shifts, in the case of FIG. 4—when the shift can be given by a number—the range is [−4,0] (the definition of the range can be generalized to more dimensions). This describes which (integer) shifts are generated. On the last, base level, asymmetric shifts (shift values) are generated (because the disparity can be only one way, all features "go" in the same direction between the left and right images) by the shifter units 62 and 72 of the disparity unit 40e (see FIG. 3). In shifter units of the disparity refinement units (e.g. shifter units 122 and 132 in the disparity refinement unit 40d, see FIG. 6), the shifts are symmetric (as in these levels a refinement is produced, which can be of either sign). The shifter unit has no learnable parameters. The extremes of the range are preferably selected based on maximal allowed disparity and on maximal allowed correction factor. The shifter unit multiplies the number of channels by $n = \max_{range} - \min_{range} + 1$, i.e. in the above example five shifts are applied in total (shift 0 and the shift −4 are also included besides shifts −1, −2 and −3).

In the general case, as mentioned above, the possible shifts may be any N-dimensional vectors. It is to be chosen (e.g. adaptively) according to the specific task. For example, in the case of the 2D disparity described in details in this document, only horizontal vectors are to be taken into account as possible shifts. In case of optical flow, the shift vector can be of any direction, e.g. such shifts can be taken into account, wherein the 2D coordinates (e.g. x and y) may vary with two in any of the directions. This means 5×5=25 different shifts, as both x and y can range from −2 to 2 in this particular example. E.g. in a 3D case, variations with two in any of the x, y, z directions, mean 125 different shifts. In the case, when a weighted value is obtained for the shift based on probabilities, possible shift vectors are to be added up in a weighted sum. As illustrated, the notion of shifts can be generalized in a straightforward way from single numbers to multidimensional vectors.

Figure 5A:
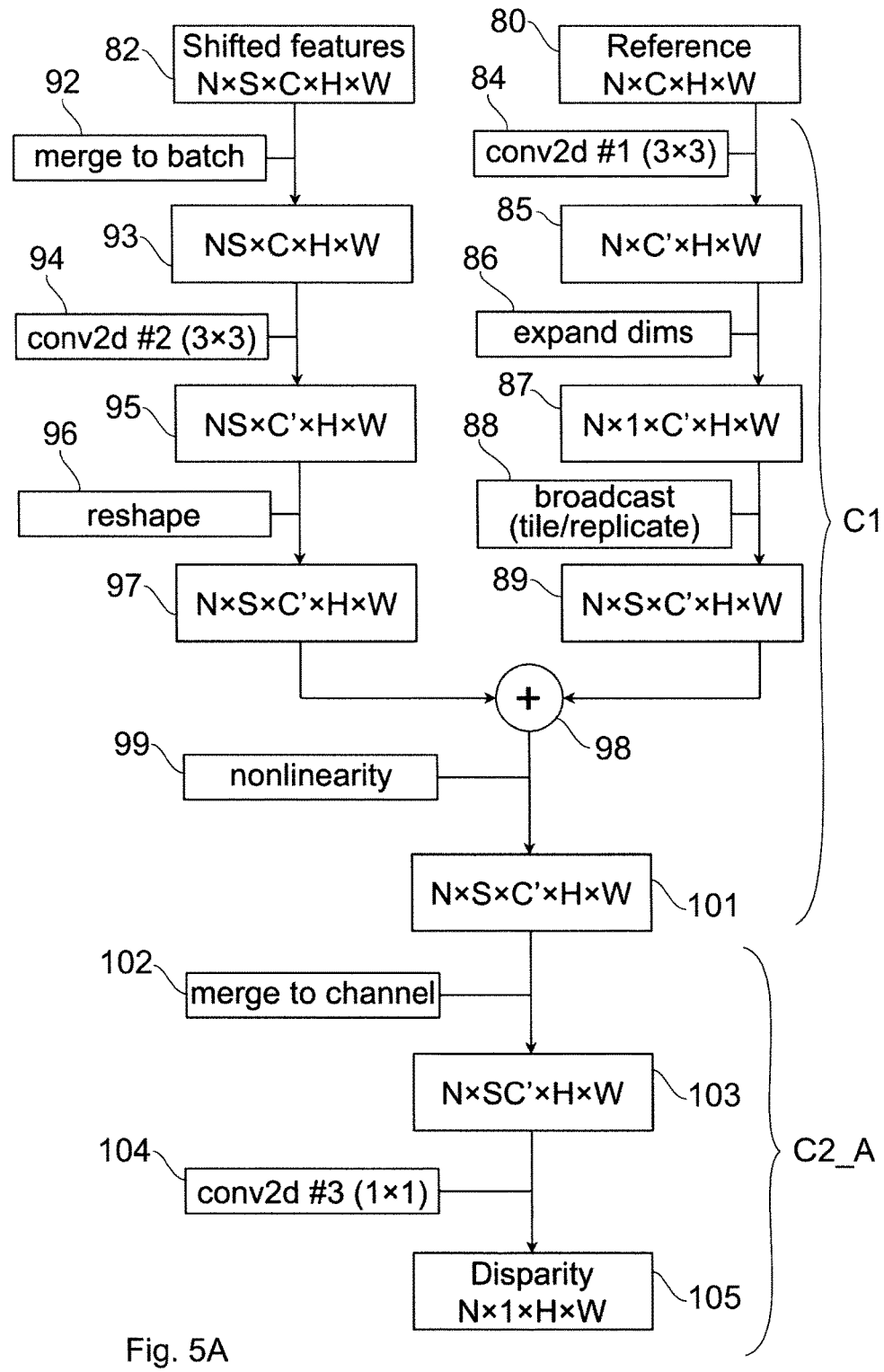
FIG. 5A illustrates the block diagram of an embodiment of the comparator unit applied in the disparity (refinement) unit.
Figure 5B:
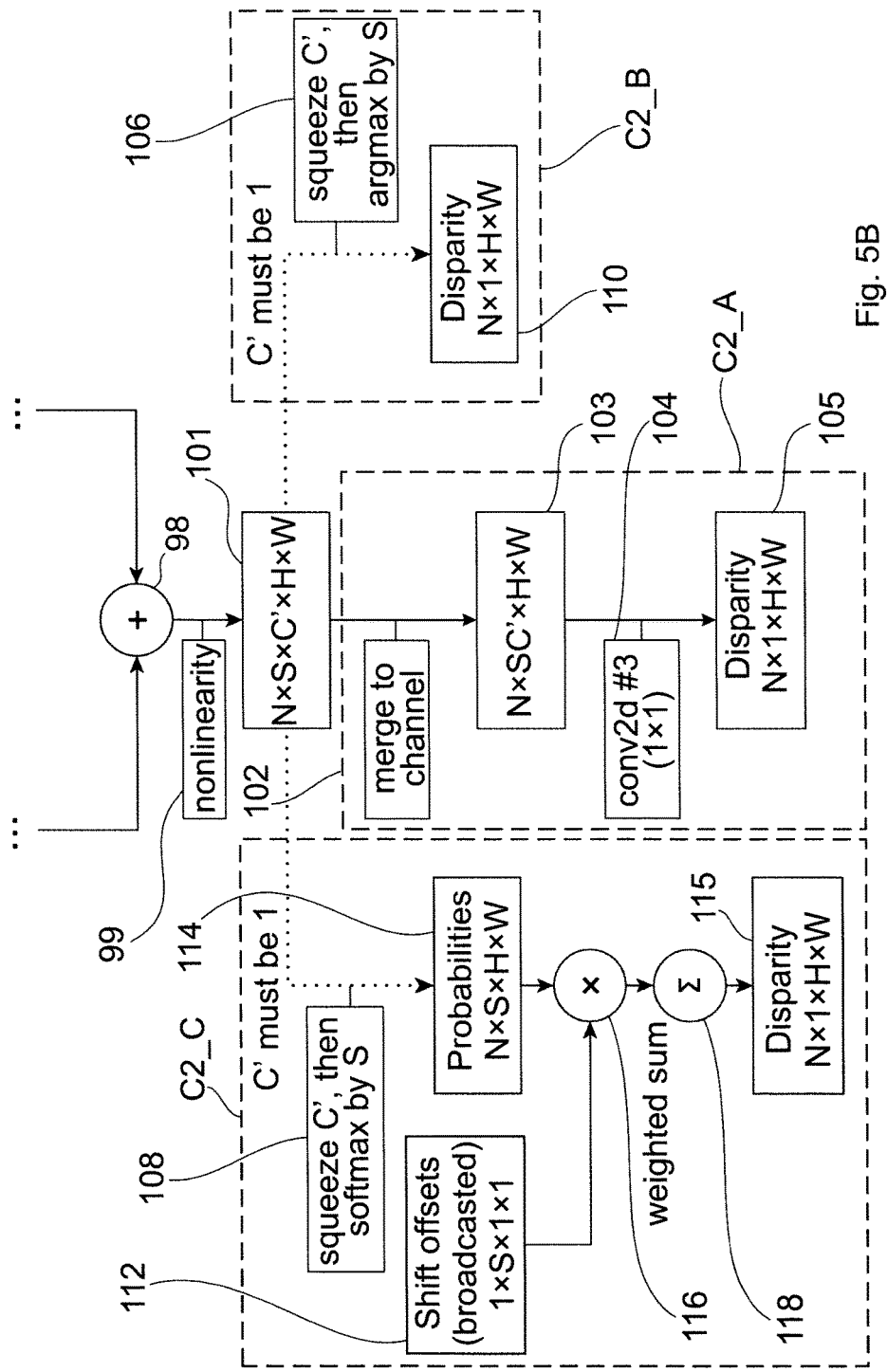
FIG. 5B illustrates possible variations of calculating the disparity in the comparator unit.

FIG. 5A shows the structure of the comparator in an embodiment. It is hereby noted that the values given in FIGS. 5A and 5B are exemplary (e.g. the size of the convolution kernel). A comparator unit receives as a first input a feature map from one of the sides of the feature map hierarchy (for example the left one). This feature map is denoted by a reference number 80 in FIG. 5A and labelled as "Reference". The comparator unit receives as a second input the shifted feature maps (denoted by a reference number 82) of the other side of the feature map hierarchy (for example the right one if the other is the left one) from the same level.

In FIGS. 5A and 5B the operation of the comparator unit is illustrated for disparity. However, it is clear that the scheme of FIGS. 5A and 5B can be applied generally for obtaining a displacement map by choosing the appropriate dimensions. Furthermore, in FIGS. 5A and 5B a batch dimension (denoted by N) is introduced. The batch dimension is used when there are more than one instances available from a specific type of input which should be processed in the same way, in parallel. For example, when more than one stereo camera pairs are arranged in a car for generating disparity, then more than one are available from e.g. the left input image and right input image, respectively. The same processing pipeline can then often be used to process these input data pairs in parallel.

Thus, in the embodiments of FIGS. 5A and 5B, on its output, the comparator unit produces a disparity map, which is, in this example, a single channel tensor with the same spatial dimensions as the input features (i.e. each of the pair of feature maps). In general, a displacement map can be generated in the same way. In FIG. 5A, a disparity map 105 having dimensions N×1×H×W is obtained on the output of the comparator unit, while the reference has dimensions N×C×H×W. The spatial dimensions in this case are the height (H) and width (W) which are the same for the reference feature map and the disparity. In the comparator unit, the channel number (C) is reduced from C to 1 (i.e. to the channel number of the disparity, which is one in this example), see below for the corresponding details. According to the approach applied throughout this document, the feature channels correspond to the feature maps, while the coordinate channels correspond to the displacement map (here, disparity map). Accordingly, the number of feature channels is reduced from C to the number of coordinate channels (i.e. to the channel number of the displacement map, here disparity map) which is eventually one for the present example.

The comparator unit performs the comparison of the feature map selected as the reference and the other feature map on the same level on which several different shifts have been made. Accordingly, in the example illustrated in FIG. 2, the disparity map does not have multiple coordinate channels, it has a single number (the disparity value) for its every pixel. In contrast, the displacement map has two values for each pixel in case of 2D optical flow, i.e. two coordinate channels, while it has three values for each pixel in case of 3D medical image registration, i.e. three coordinate channels. Thus, in this case the tensor of the disparity map is a matrix of pixels with one channel according to the channel reduction performed in the comparator unit (for the changes in the dimensions, see FIG. 5A). The disparity map generated by the comparator unit shows for each of its pixels a shift value (disparity, displacement) between the reference and the other feature map (FIG. 5B shows different possibilities for obtaining disparity in the comparator unit, see below for details).

In the embodiments illustrated in FIGS. 5A and 5B, the comparator unit has two different building blocks (subunits): the first subunit (a comparison map generating unit C1 in FIG. 5A, it may also be called a first block) compares every possible shift (i.e. feature maps with different shifts) to the reference (i.e. to that feature map in a level which has been selected as reference), the other subunit considers these comparison results and outputs the disparity (a first resultant shift generating unit C2_A in FIG. 5A, and a first, a second and a third resultant shift generating units C2_A, C2_B and C2_C in FIG. 5B; it may also be called a second block).

In the following, an exemplary realization of the embodiment of the comparator unit of FIG. 5A is described in detail. In the example shown in FIG. 5A a reference feature map 80 represented by a tensor with dimensions of N×C×H×W is given as a first input to the comparison map generating unit C1 of the comparator unit (this branch—right hand side in the figure—is referred also as a first calculation branch). As a second input shifted feature maps 82 (labelled as shifted features) represented by a tensor with dimensions N×S×C× H×W are given to the comparator unit (where S is the number of applied shifts; this branch—left hand side in the figure—is referred also as a second calculation branch).

In the first calculation branch, a first comparing convolution unit 84 is applied on the reference feature map 80 (the word comparing in the name of the unit 84 merely suggests that it is applied in the comparator, it could be simply called convolution unit, i.e. a unit performing a convolution [operation]); as the result of this operation the channel dimension of the reference feature map 80 (C) changes to C' (thus, the dimensions in first intermediate data are N×C'×H×W). C' is equal or is not equal to C. In the illustrated example the comparing convolution unit 84 (labelled #1) has a kernel with dimensions of 3×3 pixels (shortly, dimensions of 3×3). Furthermore, in the example a two-dimensional convolution operator is applied, accordingly, the kernel of the operation scans the so-called width and height dimensions of the image.

In the second calculation branch, a "merge to batch" unit 92 is applied on the input shifted feature maps, which facilitates that the calculation can be performed effectively in a parallelized way by means of a parallel processing architecture for the several different shifts (the dimensions are transformed to NS×C×H×W in fourth intermediate data 93). In other words, as we have a shifted version of the input feature map for each possible offset, we can treat these feature maps as a batch (i.e. calculation branches which can be calculated simultaneously) and then process them simultaneously with the convolution unit (in parallel, applying the same convolution operation to each element of the batch). A second comparing convolution unit 94 is applied on this "batched" input resulting in fifth intermediate data 95 having dimensions NS×C'×H×W. In the illustrated example, the second comparing convolution unit 94 (labelled #2) has the same properties as the first comparing convolution unit 84 (has 3×3 kernel, and it is a 2D convolution operation). Thus, the main parameters of units 84 and 94 are the same (both transform the channel number from C to C'), however, the weights learned during their learning process are typically different. During the learning process, the learnable parameters of these convolution units 84, 94 converge to values with which the functions of the comparator can be optimally performed.

These comparing convolution units 84 and 94 are effectively "halves" of a single convolution unit that would be applied on the reference feature map and the channel-concatenated version of each shifted feature map, respectively, as the results are added together by an addition unit 98 of the comparator unit which addition unit 98 performs preferably a broadcast-addition operation. They are here separated from each other to emphasize the fact that one of the halves (the branch with the comparing convolution unit 94) needs to be performed S times, where S is the number of possible shift offsets; while the other one (the branch with the comparing convolution unit 84) needs to be performed only once, on the reference feature map. After the addition unit 98 the result is the same as if, for each shift offset, we performed a single convolution for the concatenated version of the shifted feature map and the reference map. This separation of the comparing convolution units 84 and 94 is therefore very advantageous from the point of view of computational costs.

After the respective comparing convolution units 84, 94 in the calculation branches, the data is brought into data shapes which are compatible with each other. Accordingly, in the second calculation branch a data reshape unit 96 is applied (transforming the data into a format of N×S×C'× H×W in a sixth intermediate data 97), by the help of which the data is transformed back from the "batched" format (units 92 and 96 perform inverse operations of each other as it is clear from the changes of the dimensions in the second calculation branch).

To have a compatible data format with this in the first calculation branch, first a dimension expanding unit 86 (labelled "expand dims") is applied in the first intermediate data 85 to have a second intermediate data 87 with N×1× C'×H×W dimensions, i.e. to expand dimensions with a shift dimension, the value of which is one at this stage. After that a replicating operation is performed by a replicating unit 88 in the first calculation branch. By the help of the replicating unit 88 (may be also called broadcast unit; labelled "broadcast (tile/replicate)"), the data in the first calculational branch is prepared for the addition unit 98 (it has N×S×C'× H×W dimensions in a third intermediate data 89), i.e. (virtually) replicated/expanded according to the number of shifts applied in the second calculation branch.

Typically, this should not be thought of as an actual replication of bytes in memory, but only a conceptual (i.e. virtual) replication. In other words, let us consider a broadcast-add operation, where the left-hand-side (LHS) and right-hand-side (RHS) of the addition have different dimensions (one of them, e.g. the LHS consists of only 1 plane in a certain dimension, while the other one may have multiple planes according to the number of the shifts). During the addition operation, e.g. the LHS is not actually replicated to match the shape of the RHS, but added to each plane of the RHS without actually replicating (copying) data pertaining to the LHS in the computer memory. Thus, the replicating unit preferably symbolises this kind of preparation for the addition, not the actual replication of data.

Therefore, as the consequence of the same data format (N×S×C'×H×W), the data obtained at the end of the two calculation branches can be broadcast added (as mentioned above the broadcast operation is preferably virtual in the replicating unit 88, thus the operation of the replicating unit contributes to the broadcast addition operation) by the addition unit 98. The addition unit 98 gives the output of the comparison map generating unit C1 of the comparator unit; which output comprises the comparisons of feature maps for the different shifts. Thus, the task of comparison map generating unit C1 is to compare each shift to the reference.

The calculation structure applied in the comparison map generating unit C1 of the comparator unit gives the same result as a calculation in which the reference is compared to each of the shifts separately (which would be much less calculation-cost effective than the above scheme). In other words, according to the above detailed calculation scheme, the comparison applied in the comparison map generating unit C1 is mathematically separated into two calculation branches, wherein, in the first branch, convolution is applied purely on the reference, and, in the second branch, convolution is applied on shifted data. This separation facilitates that the calculation for the reference is to be performed only once, not for every shift separately. This yields a huge advantage in view of calculation-cost effectiveness. Applying the appropriate data reshape operations as detailed above, the addition unit 98 yields the same result as if the comparisons would have been performed for every shift separately. The output of the addition unit 98 is called resultant comparison data map below (its height and width are the same as both that of the feature maps on which the comparator unit is applied, and the disparity map which is the resultant output of the comparator unit). The comparison data map is a simple auxiliary intermediate data set (besides the first and second intermediate comparison data maps in the two branches of the comparator, see below), thus may also be called simply some kind of intermediate data. The comparison data map is not shown in FIG. 5A, only a seventh intermediate data 101 is shown which is obtained from the comparison data map by the application of a nonlinearity unit 99, which is the last unit of the comparison map generating unit C1. The data structure in the seventh intermediate data 101 remains the same N×S×C'×H×W.

Thus, in the resultant shift generating unit C2_A, a "to channel" data reshape operation is done, i.e. the output data of the addition unit 98 is stacked by channels by a stacking unit 102 (labelled by "merge to channel"). This operation stacks the channel dimensions of the subtensors corresponding to the different shifts, i.e. merges the shift dimension to the channel dimension. Accordingly, the data format in an eight intermediate data 103 is N×SC'×H×W. In this embodiment the appropriate disparity values are obtained from this tensor of data by the help of a shift investigating convolution unit 104 (since in this approach the disparity values are generated by a convolution unit which is trained for comparison, non-integer numbers can also be generated as disparity values by the comparator unit shown in FIG. 5A, even though the shifts/shifting values used by the shifter unit were integers).

Thus, at this stage, results with different shifts are to be compared (with stacking to channels). As illustrated by FIG. 5A, in this preferred example, a convolution unit with smaller kernel (in the example a kernel of 1×1 in the shift investigating convolution unit 104) is applied for the larger amount of data (i.e. for the stacked data) and a convolution unit with larger kernel (larger compared to the other convolution) is applied to the batched shifted feature maps (i.e. fourth intermediate data 93 in FIG. 5A; a batched feature map in block C1 constitutes smaller amount of data than the full stacked data in the resultant shift generating unit C2_A). This proportion of the kernel sizes of the convolution units is advantageous from the aspect of calculation-cost effectiveness.

It is noted that the comparator unit in the disparity unit or in the disparity refinement unit (in general, in the displacement unit or in the displacement refinement unit) is applied to different feature channel numbers on the different levels. Besides, the comparator unit typically outputs an initial or correction disparity (in general, displacement) map, the channel number of both is reduced to one in the present example or generally to the number of coordinate channels. In other words, as illustrated in FIG. 5A, the comparison for obtaining the disparity information is performed for all of the feature channels. Accordingly, the comparator unit is sensitive to the feature information stored in the different feature map levels. Thereby, the disparity map generation process, which utilizes the advantages of machine learning, becomes particularly efficient, using not only low-level features such as edges and regions with the same colour or pattern in the left and right images, but also higher-level features such as a possible inner semantic representation of e.g. a road scene, meaning that the same object on the two images can be matched more precisely to each other.

The shift investigating convolution unit 104 performs a convolution operation which has preferably 1×1 kernel. The function of this convolution is to calculate optimal displacement values from the information gained through comparison of the feature maps performed by C1. According to the dimensions applied in the example, a two-dimensional convolution is applied preferably (sweeping the height and width dimension). The shift investigating convolution unit 104 outputs for every single pixel a shift value, i.e. the value of the disparity in the respective position. The shift investigating convolution unit 104 investigates one pixel at a time and is taught to output an appropriate shift (e.g. shifting value) based on learning as resultant shift on the basis of the data stored in the channel dimension.

FIG. 5A illustrates the correspondence in the image sizes between the input feature maps and the output disparity, so a resultant shift can be obtained for every pixel position of the disparity map. Accordingly, in FIG. 5A the output of the resultant shift generating unit C2_A of the comparator unit is a disparity map of the respective level from which the reference feature map and the feature map on which shift operations have been done are selected. To summarize, in the resultant shift generating unit C2_A, the optimal shift offset is determined for each data element (pixel) by the help of a preferably 1×1 convolution.

The advantage of implementing the above detailed embodiment of the comparator of FIG. 5A is its high efficiency. It is to be noted that the addition unit 98 adds the convolved reference (reference to which convolution has been applied) to convolved variant of every possible shift separately. As mentioned above, this operation is equivalent as concatenating reference features with output shift one-by-one, convolving them, and concatenating the results. However, this latter approach would require much more computation resources than the approach of the above embodiment, and would perform convolving the reference many times (since the concatenation is performed as the first step thereof), resulting in redundant computation according to the multiple convolution operations applied on the reference. In contrast, in the approach of the above embodiment, the convolution operation is applied on the reference only once.

Note that the convolutions of the comparison map generating unit C1 (the same comparison map generating unit C1 is applied in the embodiment of FIG. 5B) do not have a nonlinearity, i.e. the comparing convolution units 84, 94 in the comparison map generating unit C1 are not followed by a non-linear layer. That is why the convolution units 84, 94 can be split this way. The nonlinearity is preferably applied after the broadcast-add operation (e.g. after addition unit 98 at output of the comparison map generating unit C1) in the nonlinearity unit 99. The nonlinearity is for example a ReLU non-linearity, i.e. a ReLU non-linear layer applied to the output of the addition unit 98.

As detailed above, in the resultant shift generating unit C2_A a convolution with a 1×1 kernel is performed. The reason for this is that it works on much higher channel count (as shifts are merged to the channel dimension here), and we would like to avoid using large convolution kernels with these. In the light of the high channel number, a larger convolution kernel (e.g. 3×3) would be much slower. Using bigger kernel in the resultant shift generating unit C2_A is unnecessary because of the preferably applied 3×3 kernel in the comparison map generating unit C1. A further advantage of the 1×1 kernel is that the information is needed from a single data element (pixel), which also makes unnecessary to use a bigger kernel in this convolution. However, in the comparison map generating unit C1, the channel size is much smaller, as the shift dimension is merged into the batch dimension. Because the number of operations is linearly proportional to the batch size and squarely proportional to the channel size, this results in a performance gain when the kernel applied in the shift investigating convolution unit 104 of the resultant shift generating unit C2_A is smaller than the kernel applied in the comparing convolution units 84 and 94 in the comparison map generating unit C1.

To summarize, in an embodiment of the method as illustrated in FIGS. 5A and 5B, in the displacement (e.g. disparity) generating operation for generating an output displacement map for application as the initial displacement map and/or in the displacement refinement operation for generating the output displacement map for application as the correction displacement map, matching of
  the plurality of shifted feature maps 82, wherein a shifting number thereof is the number of the different shifts, and
  the other feature map serving as a reference feature map 80 (i.e. the other feature map plays the role of a reference feature map, accordingly, mentioned by this name below)
is performed in the steps of
  applying a first comparing convolution unit 84 on the reference feature map 80 to obtain a first intermediate comparison data map,
  applying a second comparing convolution unit 94 on each of the plurality of shifted feature maps 82 to obtain a plurality of second intermediate comparison data maps,
  adding in an addition operation the first intermediate comparison data map replicated according to the number of the different shifts (i.e. replicated virtually as detailed above, or replicated physically) and the plurality of second intermediate comparison data maps to obtain a resultant comparison data map,
  generating a respective resultant shift for each data element of the resultant comparison data map in all of its at least one spatial dimension and/or time dimension, and assigning all of the respective resultant shifts to corresponding data elements in the output displacement map (i.e. according to their data element in the resultant comparison data map).

In the above embodiment (as in the embodiment illustrated in FIG. 5A, i.e. in the variation comprising the resultant shift generating unit C2_A) preferably the respective resultant shift for each data element of the resultant comparison data map in all of its at least one spatial dimension and/or time dimension is generated by applying a shift investigating convolution unit 104 on the resultant comparison data map. Furthermore, in this embodiment preferably the feature maps have one or more feature channels, and the resultant comparison data map is stacked by the one or more feature channels of the feature maps before applying the shift investigating convolution unit 104.

In a further variation of the above embodiment (as in the embodiment comprising the resultant shift generating unit C2_B) the respective resultant shift for each data element of the resultant comparison data map in all of its at least one spatial dimension and/or time dimension is generated by selecting a best-matching shift from the plurality of different shifts (see the description of FIG. 5B for details and further options).

In a yet further variation of the above embodiment (as in the embodiment comprising the resultant shift generating unit C2_C) the respective resultant shift for each data element of the resultant comparison data map in all of its at least one spatial dimension and/or time dimension is generated by
  establishing a plurality of displacement bins for every different shift values,
  generating displacement probabilities for each of the displacement bins, the displacement probabilities are calculated based on the resultant comparison data map, and
  obtaining the resultant shift by weighting the shift values by the corresponding displacement probabilities (see the description of FIG. 5B for details and further options).

Preferably, in any variations of the above embodiment before generating a respective resultant shift for each data element of the resultant comparison data map in all of its at least one spatial dimension and/or time dimension, a non-linearity layer is applied to the resultant comparison data map.

FIG. 5B shows three alternative possibilities for generating disparity (all of the resultant shift generating units C2_A, C2_B and C2_C output a disparity map having dimensions N×1×H×W; these approaches can be, of course, generalized to displacement generation). Accordingly, the resultant shift generating units C2_A, C2_B and C2_C are different possibilities applicable on the seventh intermediate data 101 to yield a disparity. It is possible to have all of these possibilities and, based on a setting, one of them is chosen. Alternatively, it is also possible to implement only one of the resultant shift generating units C2_A (like in the embodiment of FIG. 5A), C2_B and C2_C.

The resultant shift generating unit C2_A of FIG. 5B is the same as illustrated in FIG. 5A (see above for details). Another alternative in FIG. 5B is the resultant shift generating unit C2_B. As denoted in the resultant shift generating unit C2_B, in this alternative C' must be one, i.e. the channel number has to be reduced in the comparison map generating unit C1 from C to 1 (C') by means of comparing convolution units 84 and 94. This can be done by setting the number of output channels of these convolutions to one. In the resultant shift generating unit C2_B a first intermediate unit 106 is applied to the seventh intermediate data 101 in which the channel dimension (in which C' is one) is squeezed, i.e. eliminated without changing the underlying data itself (as a result we have a data format N×S×H×W), after that in the same first intermediate unit 106 an argmax (shown in FIG. 5B) or argmin operation is applied in S, depending on whether as a result of comparison in the comparison map generating unit C1 the maximum or minimum comparison value should correspond to the shift with best correspondence. Either argmax or argmin can be used, but one of them must be decided on at the beginning, before training the network. The use of argmax or argmin determines whether the comparison map generating unit C1 will output similarity scores (argmax) or dissimilarity scores (argmin), since during the training phase of the comparator unit, the choice of argmax or argmin will cause the comparing convolution units to learn to output bigger or smaller scores for better shifts. By the application of argmax or argmin the size of the shift dimension is reduced from S to one. Accordingly, this argmax or argmin function selects a shift by the help of which the best correspondence is achieved between the reference feature map and the other feature map on which the different shifts has been applied. In other words, in the resultant shift generating unit C2_B the best shift is chosen for each data element of a disparity 110 having dimensions N×1×H×W.

In an alternative embodiment illustrated by the resultant shift generating unit C2_C in FIG. 5B, the disparity is generated based on combining shift offsets with probability weights, i.e. a probability approach and discrete bins are used for estimating (generating, calculating) the resultant shift (shifting value or shifting vector in more dimensions) which is assigned to a respective pixel position of the disparity map. In this alternative the channel number C' must be one, similarly to the resultant shift generating unit C2_B. Afterwards, the channel dimension is squeezed in a second intermediate unit 108, i.e. similarly to the resultant shift generating unit C2_B, the data format after squeezing become N×S×H×W.

In the case of the resultant shift generating unit C2_C the number of output channels corresponds to the number of possible integer values of the disparity on the level under investigation, i.e. the number of applied shifts in the comparison map generating unit C1; for each of these values a discrete bin is established. Since the channel variable is squeezed and the number of possible shifts is S, the dimensions of a probability data 114 are N×S×H×W, i.e. we have a probability for each batch, each shift value and for each pixel (data element) in the height and width dimensions. In shift offsets data 112 a tensor having the same variables is established, it has dimensions 1×S×1×1. In the shift dimension it has all of the possible shift values. Multiplying the shift offsets data 112 and the probability data 114 with each other in a multiplication unit 116, and summing the multiplications in a summation unit 118, a result can be obtained for each data element of the disparity which is the weighted sum of the possible shift values and the probabilities corresponding to the bins of the respective shift values. Thereby, according to the method detailed above, the shift dimension of the data is reduced to one and a disparity 115 is obtained with dimensions N×1×H×W.

According to the label of the second intermediate unit 108, the probabilities of the probability data 114 are obtained by the help of a Softmax function, i.e. a so-called Softmax function is applied by the shift dimension in the present approach. The output of the Softmax function is expected to give the probability that the disparity has the value corresponding to a bin. For each data element of each batch element, the Softmax function acts on the shift dimension (S) of the seventh intermediate data 101, and the Softmax function is defined as $$p_i = \frac{e^{z_i}}{\sum_{j=1}^{S} e^{z_j}}$$

where the inputs of the Softmax function are the scores corresponding to the available shifting values denoted by $z_i$ (i: 1 . . . S), which comprise the shift dimension of the seventh intermediate data 101, and $p_i$ (i: 1 . . . S) are the probabilities, i.e. the output of the Softmax operation. Here S is the number of different shifting values, i.e. the number of bins. The resulting displacement value (or vector in general) is then obtained by multiplying the probabilities with the disparity values of the respective bins for every bin in unit 116 and then summing the weighted disparity values in unit 118. See the following example.

If, in an example, the possible disparity (shift) for a pixel is between 0 and 3, and the output probabilities are [0.0, 0.2, 0.7, 0.1], then the output of the comparator for the investigated pixel is to be calculated as sum([0.0, 0.2, 0.7, 0.1].*[0, 1, 2, 3])=1.9, where * means that the elements of the vectors are multiplied piece by piece. Accordingly, by this approach, a better estimation can be obtained for the disparity value of each of the pixels.

FIG. 6 shows an embodiment of the disparity refinement unit. In FIG. 6 it is denoted that the illustrated one is the disparity refinement unit 40d, but it can be any other from the disparity refinement units 40b, 40c, 40d, since these have the same structure preferably. The illustrated disparity refinement unit 40d receives left and right disparity maps 46e, 48e from the previous hierarchy level, and produces new, refined left and right disparity maps 46d, 48d as its outputs (input and output are denoted by arrows in FIG. 6). The structure of the disparity refinement unit 40d is similar to the disparity unit 40e of FIG. 3.

First, the input disparity maps 46e, 48e are upscaled (upsampled) in upscaling units 120, 130 to the next scale (in the illustrated exemplary case by a scale of 2, thus, units 120, 130 are labelled by "×2"). In the illustrated example, the upscaling is done in the spatial dimension, i.e. in the height and width according to the other direction scaling (downscaling) of the feature maps between two levels. The upscaling factor may be e.g. any power of 2 if some levels are skipped from hierarchy. A number being a power of 2 is a typical choice for the upscaling factor, but other numbers (in particular, integers) can be used as the upscaling factor (taking into consideration the scale of the corresponding pair of feature maps, the scale of the pair of feature maps applied for refinement have to be in correspondence with the displacement map of the respective level; see also below for the possible upscaling of the output disparity maps). Upscaling (upsampling) of the input disparity map can be done by any upsampling method (for example bilinear or nearest neighbour interpolation, deconvolution, or a method comprised of nearest neighbour interpolation followed by a depthwise convolution, etc). Upscaling should include the multiplication of the disparity values (or, in general, displacement vectors) by the upscaling factor, since as the feature maps (20*d* and 30*d* in FIG. 6) are larger by a certain factor than the previous feature maps that were used when calculating the input disparities (46*e* and 48*e* in FIG. 6), the displacement between two previously matched data elements should also be multiplied by the same upscaling factor.

In the following we describe the operation of disparity refinement unit 40*d* starting from the left upscaling unit 120, going through a right warping unit 134 and a right shifter unit 132, and ending at a left comparator unit 126 and a left addition unit 128. Since the structure of disparity refinement unit 40*d* is symmetric from the left to the right and vice versa, this description can also be applied on a route starting from the right upscaling unit 130, going through a left warping unit 124 and left shifter unit 122, and ending at a right comparator unit and right addition unit 138.

The output of the left upscaling unit 120 is given to a warping unit 134 for warping the right feature map 30*d*, as well as this output is forwarded to an addition unit 128. The addition unit generates the output left disparity map 46*d* of the disparity refinement unit 40*d* on the basis of the upscaled version of the disparity map 46*e* and of the disparity (refinement) generated by a (left) comparator unit 126. The right disparity map 48*d* of the next level is generated in a similar way using an addition unit 138 on the output of upscaling unit 130 and the output of a (right) comparator unit 136. Warping units 124 and 134 perform warping operations as defined above, i.e., roughly speaking, a disparity map is applied on a feature map in these operations.

The output of the left upscaling unit 120 is routed to the right warping unit 134. In the warping unit 134, its input, namely the right feature map 30*d* is warped by the upscaled version of the disparity map 46*e* of the previous level. In other words, the right feature map of the present level is warped by the help of the upscaled disparity of the lower neighbouring level, i.e. the disparity of the lower level in the figure is applied on the present level right feature map to be well comparable with the left feature maps, since the lower level disparity map is a good approximation for the final disparity (this way the non-reference features become closer in space to the reference features). This warped version of the right feature map 30*d* of the present level is given to a right shifter unit 132 which produces the appropriate number of shifts and forwards the shifted set of warped right feature map to the left comparator unit 126 (similarly to the disparity unit 40*e*, cross connections 142 and 144 are applied between shifter units and another-side comparator units, see FIG. 6).

The use of a warping unit before the respective shifter unit allows for applying a relatively low number of symmetric shifts (since the warped version of a right feature map is very close to a same level left feature map and vice versa). In other words, the shifter unit (shift block) here produces symmetric shifts, so it can improve the coarse disparity map in any direction. This makes the disparity refinement unit highly effective due to the following reasons (in other words, the comparator needs only to deal with smaller number of shifts which results in increased performance).

The left comparator unit gets as inputs the left feature map 20*d* as a reference and shifted versions of the right feature map 30*d* warped by the previous level (lower in the figure) left disparity map 46*e*. Since this type of warping is used, the warping unit 134 outputs a good approximation for the left feature map of the present, which is then compared to real left feature map 20*d* of the present level. Therefore, the output of the comparator will be such a disparity map correction, by which the coarser estimation of the previous level (which is a good estimation on its own level) is refined by the help of finer resolution data (i.e. by the help of feature maps with higher resolution). In a simplified example, we can see on the coarser level that there is four pixels shift of an object on the smaller pair of feature maps corresponding to that level. Thus, at the refining next level the shift would be of sixteen pixels (using an upscaling factor of four), but this is then refined—since it is better observable on the feature maps of the next level—; accordingly, the prediction for the shift may be fifteen at the next level.

In the realisation of FIG. 2 (when the embodiment of FIG. 6 is applied for all of the disparity refinement units 40*b*, 40*c*, 40*d*), the size of the final output disparity maps 46 and 48, is downscaled by four compared to the input images (left image 20*a* and right image 30*a*). Of course, disparity maps with the same size as the input images can be obtained. If such disparity maps are to be obtained, upscaling units (similar to upscaling units 120 and 130 of FIG. 6) have to be applied on the outputs of the disparity refinement unit 40*b*; wherein the upscaling units apply an upscaling factor of four, increasing both the resolution of the disparity maps and, at the same time, the magnitude of the displacement vectors (e.g. disparity values) by the same upscaling factor.

Accordingly, in the addition unit 128 the disparity map correction obtained in the comparator unit 126 and the upscaled version of the disparity map 46*e* of the previous level are added, thus giving a refined disparity map. According to the above approach, the previous level disparity map is corrected on a pixel-per-pixel basis in the disparity refinement unit 40*d*.

In summary, a hierarchical structure is applied in the method and apparatus according to the invention, so it is needed in an embodiment on each level to deal only with a small number of possible shifts between the corresponding feature maps. Because of this, the method and apparatus of the respective embodiment provide a fast way to calculate the disparity map between the two images. On every feature scale, the left and right features are compared in a special manner, which is fast, easy to learn and is robust to small errors in camera rectification.

In the method and apparatus according to the invention, the hierarchical structure makes use of features of the base network at different scales. To sum up the above considerations, the comparator on a next scale needs to deal only with a residual correction factor, which results in a dramatically smaller number of possible shifts to be applied, thus results in much faster runtime. When comparing the feature maps to each other, one of the left feature map and right feature map is selected as reference ($F_{ref}$) and the other is compared to it (Fc). Fc is shifted by all possible disparity values (i.e. shifts which can also be represented by vectors) at the given level of feature hierarchy (typically at most five possible disparity values per level), and compared to $F_{ref}$ at every shift.

As mentioned above, some embodiments of the invention relate to an apparatus for generating a displacement map (e.g. for generating a disparity map of a stereo image pair). The above detailed embodiments of the method according to the invention can also be described as embodiments of the apparatus according to the invention.

Accordingly, in an embodiment of the apparatus (see FIG. 3)

the displacement unit 40*e* further comprises a first shifter unit (disparity unit 40*e* and shifter units 62, 72 in FIG. 3) adapted for generating a plurality of shifted feature maps of the first feature map of the base pair of feature maps by applying a plurality of different shifts on the first feature map of the base pair of feature maps, and the first comparator unit (comparator units 64, 74 in FIG. 3) is adapted for obtaining the initial displacement map by generating a resultant shift for each data element (pixel) position of the second feature map of the base pair of feature maps on the basis of investigating the matching between the plurality of shifted feature maps of the first feature map of the base pair of feature maps and the second feature map of the base pair of feature maps.

In a further embodiment of the apparatus (may be combined with the previous embodiment; see FIG. 6)

the displacement refinement unit (disparity refinement units 40b, 40c, 40d in FIG. 2, or one or more from these) comprises a second shifter unit (shifter units 122, 132 in FIG. 6) adapted for generating a plurality of shifted feature maps of a first feature map of the refinement pair of feature maps by applying a plurality of different shifts on the warped version of the first feature map of the refinement pair of feature maps, and the second comparator unit (comparator units 126, 136 in FIG. 6) is adapted for obtaining the correction displacement map by generating a resultant shift for each data element (pixel) position of a second feature map of the refinement pair of feature maps on the basis of investigating the matching between the plurality of shifted feature maps of the first feature map of the refinement pair of feature maps and the second feature map of the refinement pair of feature maps.

Similarly to the first and second input datasets, the "first" and "second" designations when mentioning in first/second comparator unit or first/second shifter unit only refer to the fact that both the displacement unit and the displacement refinement unit (e.g. the disparity unit and the disparity refinement unit) have their own such subunits. This proposition does not mean that the inner structure (realisation) should itself be different for the respective first and second units. In fact, the inner structures of respective first and second shifter units are preferably the same; in the comparator unit, for example, the preferably applied weights of the convolutions (see first and second comparing convolution units 84, 94 in FIGS. 5A and 5B) may be different.

In any of the previous two embodiments preferably (see FIGS. 5A and 5B) for matching the plurality of shifted feature maps, a shifting number thereof is the number of different shifting values, and the second feature map serving as a reference feature map 80, the first comparator unit, for generating an output displacement map for applying as the initial displacement map, and/or the second comparator unit, for generating the output displacement map for applying as the correction displacement map, comprises a first comparing convolution unit 84 adapted for applying on the reference feature map 80 to obtain a first intermediate comparison data map, a second comparing convolution unit 94 adapted for applying on each of the plurality of shifted feature maps to obtain a plurality of second intermediate comparison data maps, an addition unit 98 adapted for adding the first intermediate comparison data map (virtually or physically) replicated according to the number of the different shifts and the plurality of the second intermediate comparison data maps to obtain a resultant comparison data map, a resultant shift generating unit (see e.g. the resultant shift generating units C2_A, C2_B, C2_C of FIG. 5B) adapted for generating a respective resultant shift for each data element of the resultant comparison data map in all of its at least one spatial dimension and/or time dimension, and for assigning all of the respective resultant shifts to corresponding data elements in the output displacement map (i.e. according to their data element in the resultant comparison data map).

Accordingly, units 84, 94, 98 and a resultant shift generating unit are comprised by the first comparator unit and/or the second comparator unit. The purpose of these units is to generate output displacement (e.g. disparity) map for different purposes, i.e. the output displacement map will be the initial displacement map itself in the first comparator unit of the displacement unit, and it will be the correction displacement map in the second comparator unit of a displacement refinement unit.

Preferably, in the previous embodiment the resultant shift generating unit (the resultant shift generating unit C2_A is an example for the embodiment) comprises a shift investigating convolution unit 104 being adapted for being applied on the resultant comparison data map to generate the respective resultant shift for each data element of the resultant comparison data map in all of its at least one spatial dimension and/or time dimension, and being adapted for assigning all of the respective resultant shifts to corresponding data elements in the output displacement map (i.e. according to their data element in the resultant comparison data map).

In particular, in the previous embodiment the feature maps have one or more feature channels and the first comparator unit and/or the second comparator unit comprises a stacking unit 102 adapted for stacking the resultant comparison data map by the one or more feature channels of the feature maps before applying the shift investigating convolution unit 104.

Using an alternative of the resultant shift generating unit the respective resultant shift for each data element of the resultant comparison data map in all of its at least one spatial dimension and/or time dimension is generated by means of the resultant shift generating unit (the resultant shift generating unit C2_B is an example for the embodiment) by selecting a best-matching shift from the plurality of different shifts.

Using a further alternative of the resultant shift generating unit the respective resultant shift for each data element of the resultant comparison data map in all of its at least one spatial dimension and/or time dimension is generated by means of the resultant shift generating unit (the resultant shift generating unit C2_B is an example for the embodiment) by establishing a plurality of displacement bins for every different possible displacement value, generating displacement probabilities for each of the displacement bins, the displacement probabilities are calculated based on the resultant comparison data map, and obtaining the resultant shift by weighting the possible displacement values by the corresponding displacement probabilities.

Preferably, in any of the five previous embodiments the apparatus (namely the comparison map generating unit C1) comprising a non-linearity layer adapted for being applied to the resultant comparison data map before generating a respective resultant shift for each data element of the resultant comparison data map in all of its at least one spatial dimension and/or time dimension.

In an embodiment of the apparatus according to the invention, preferably, the feature maps have one or more feature channels, and the displacement unit and/or the displacement refinement unit are adapted for performing the matching by taking into account the one or more feature channels of the feature maps, and for generating an initial displacement map and a correction displacement map, respectively, with the same or less number of coordinate channels than the number of the at least one spatial dimension and/or time dimension of the input datasets (in case of the embodiment of FIG. 2, the disparity map has a single coordinate channel since it may comprise shifts only in one direction [shift is a single number]). Accordingly, the initial displacement map and the correction displacement map (these have the same channel number) have as many coordinate channels as the number of spatial dimensions/time dimensions if otherwise not constrained by the task.

In a further embodiment of the apparatus according to the invention (see FIG. 2 for the reference numbers), the displacement unit (e.g. disparity unit 40e) is adapted for generating a pair of a first initial displacement map and a second initial displacement map, and the displacement refinement unit (disparity refinement units 40b, 40c, 40d) is adapted for generating, based on the pair of the first initial displacement map and a second initial displacement map and a pair of a first correction displacement map and a second correction displacement map generated by respective second comparator units thereof, a pair of a first updated displacement map and a second updated displacement map.

In an embodiment of the apparatus (as in the illustrated embodiments), the input dataset pair is a stereo image pair, the displacement map is a disparity map, the displacement unit is a disparity unit and the displacement refinement unit is a disparity refinement unit.

The invention is, of course, not limited to the preferred embodiments described in details above, but further variants, modifications and developments are possible within the scope of protection determined by the claims. Furthermore, all embodiments that can be defined by any arbitrary dependent claim combination belong to the invention.

The invention claimed is:

1. A method for generating a displacement map of a first input dataset and a second input dataset of an input dataset pair, each input dataset having at least one spatial dimension and/or time dimension, the method comprising the steps of
   processing the first input dataset and the second input dataset by means of a neural network based feature extractor (25) so as to generate a feature map hierarchy (50) comprising a base pair of feature maps (20e, 30e) and a refinement pair of feature maps (20b, 30b, 20c, 30c, 20d, 30d), each pair of feature maps (20b, 30b, 20c, 30c, 20d, 30d, 20e, 30e) constituting one level of the feature map hierarchy (50), the refinement pair of feature maps (20b, 30b, 20c, 30c, 20d, 30d) having less coarse resolution in all of their at least one spatial dimension and/or time dimension than the base pair of feature maps (20e, 30e);
   generating an initial displacement map in a displacement generating operation for the base pair of feature maps (20e, 30e) of the feature map hierarchy (50) based on matching a first feature map of the base pair of feature maps (20e, 30e) with a second feature map of the base pair of feature maps (20e, 30e);
   in a displacement refinement operation,
   upscaling the initial displacement map in all of its at least one spatial dimension and/or time dimension to the scale of the refinement pair of feature maps (20b, 30b, 20c, 30c, 20d, 30d) of the feature map hierarchy (50) with a respective upscaling factor and multiplying the values of the initial displacement map with the respective upscaling factor to generate an upscaled initial displacement map,
   generating a warped version of the first feature map of the refinement pair of feature maps (20b, 30b, 20c, 30c, 20d, 30d) by carrying out a warping operation using the upscaled initial displacement map on a first feature map of the refinement pair of feature maps (20b, 30b, 20c, 30c, 20d, 30d) of the feature map hierarchy (50),
   matching the warped version of the first feature map of the refinement pair of feature maps (20b, 30b, 20c, 30c, 20d, 30d) with the second feature map of the refinement pair of feature maps (20b, 30b, 20c, 30c, 20d, 30d) so as to obtain a correction displacement map for the warped version of the first feature map of the refinement pair of feature maps (20b, 30b, 20c, 30c, 20d, 30d) and the second feature map of the refinement pair of feature maps (20b, 30b, 20c, 30c, 20d, 30d), which correction displacement map is added to the upscaled initial displacement map so as to obtain an updated displacement map.

2. The method according to claim 1, characterized in that at least two refinement pairs of feature maps (20b, 30b, 20c, 30c, 20d, 30d) are comprised in the feature map hierarchy (50), wherein a first refinement pair of feature maps (20d, 30d) being closest to the base pair of feature maps (20e, 30e) in the feature map hierarchy (50) has a less coarse resolution than the base pair of feature maps (20e, 30e), and each successive refinement pair of feature maps (20b, 30b, 20c, 30c) being less close to the base pair of feature maps (20e, 30e) in the feature map hierarchy (50) than the first refinement pair of feature maps (20d, 30d) has a less coarse resolution than a neighbouring refinement pair of feature maps (20d, 30d) being closer to the base pair of feature maps (20e, 30e) in the feature map hierarchy (50) than the respective successive refinement pair of feature maps (20b, 30b, 20c, 30c),
   the displacement refinement operation is performed using the first refinement pair of feature maps (20d, 30d) and a respective further displacement refinement operation is performed for each successive refinement pair of feature maps (20b, 30b, 20c, 30c), wherein in each further displacement refinement operation the updated displacement map obtained for the neighbouring refinement pair of feature maps (20d, 30d) being closer to the base pair of feature maps (20e, 30e) in the feature map hierarchy (50) than the respective successive refinement pair of feature maps (20b, 30b, 20c, 30c) is used as the initial displacement map being upscaled, during the upscaling in the respective displacement refinement operation, to the scale of the respective successive refinement pair of feature maps (20b, 30b, 20c, 30c) with a respective upscaling factor and the values of the updated initial displacement map are multiplied with the respective upscaling factor.

3. The method according to claim 1, characterized in that in the displacement generating operation
   a plurality of shifted feature maps (82) of the first feature map of the base pair of feature maps (20e, 30e) is generated applying a plurality of different shifts on the first feature map of the base pair of feature maps (20e, 30e), and
   the initial displacement map is obtained by generating a resultant shift for each data element position of the second feature map of the base pair of feature maps (20e, 30e) on the basis of investigating the matching between the plurality of shifted feature maps (82) of the first feature map of the base pair of feature maps (20e, 30e) and the second feature map of the base pair of feature maps (20e, 30e), and/or in the displacement refinement operation a plurality of shifted feature maps (82) of a first feature map of the refinement pair of feature maps (20b, 30b, 20c, 30c, 20d, 30d) is generated applying a plurality of different shifts on the warped version of the first feature map of the refinement pair of feature maps (20b, 30b, 20c, 30c, 20d, 30d), the correction displacement map is obtained by generating a resultant shift for each data element position of a second feature map of the refinement pair of feature maps (20b, 30b, 20c, 30c, 20d, 30d) on the basis of investigating the matching between the plurality of shifted feature maps (82) of the first feature map of the refinement pair of feature maps (20b, 30b, 20c, 30c, 20d, 30d) and the second feature map of the refinement pair of feature maps (20b, 30b, 20c, 30c, 20d, 30d).

4. The method according to claim 3, characterised in that in the displacement generating operation for generating an output displacement map for application as the initial displacement map and/or in the displacement refinement operation for generating the output displacement map for application as the correction displacement map, matching of the plurality of shifted feature maps (82), wherein a shift number thereof is the number of the different shifts, and the second feature map serving as a reference feature map (80) is performed in the steps of applying a first comparing convolution unit (84) on the reference feature map (80) to obtain a first intermediate comparison data map, applying a second comparing convolution unit (94) on each of the plurality of shifted feature maps (82) to obtain a plurality of second intermediate comparison data maps, adding in an addition operation the first intermediate comparison data map replicated according to the number of the different shifts and the plurality of second intermediate comparison data maps to obtain a resultant comparison data map, generating a respective resultant shift for each data element of the resultant comparison data map in all of its at least one spatial dimension and/or time dimension, and assigning all of the respective resultant shifts to corresponding data elements in the output displacement map.

5. The method according to claim 4, characterized in that the respective resultant shift for each data element of the resultant comparison data map in all of its at least one spatial dimension and/or time dimension is generated by applying a shift investigating convolution unit (104) on the resultant comparison data map.

6. The method according to claim 5, characterized in that the feature maps have one or more feature channels, and the resultant comparison data map is stacked by the one or more feature channels of the feature maps before applying the shift investigating convolution unit (104).

7. The method according to claim 4, characterized in that the respective resultant shift for each data element of the resultant comparison data map in all of its at least one spatial dimension and/or time dimension is generated by selecting a best-matching shift from the plurality of different shifts.

8. The method according to claim 4, characterized in that the respective resultant shift for each data element of the resultant comparison data map in all of its at least one spatial dimension and/or time dimension is generated by establishing a plurality of displacement bins for every different shift values, generating displacement probabilities for each of the displacement bins, the displacement probabilities are calculated based on the resultant comparison data map, and obtaining the resultant shift by weighting the shift values by the corresponding displacement probabilities.

9. The method according to claim 4, characterized by, before generating a respective resultant shift for each data element of the resultant comparison data map in all of its at least one spatial dimension and/or time dimension, applying a non-linearity layer to the resultant comparison data map.

10. The method according to claim 1, characterized in that the feature maps have one or more feature channels, and in the displacement generating operation and/or in the displacement refinement operation the matching is performed by taking into account the one or more feature channels of the feature maps, and an initial displacement map and a correction displacement map are generated, respectively, with the same or less number of coordinate channels than the number of the at least one spatial dimension and/or time dimension of the input datasets.

11. The method according to claim 1, characterized in that a pair of a first initial displacement map and a second initial displacement map is generated in the displacement generating operation, and, based on the pair of the first initial displacement map and the second initial displacement map and a pair of a first correction displacement map and a second correction displacement map generated in the displacement refinement operation, a pair of a first updated displacement map and a second updated displacement map is generated in the displacement refinement operation.

12. The method according to claim 1, characterized in that the input dataset pair is a pair of images of a stereo image, the displacement map is a disparity map, the displacement generating operation is a disparity generating operation and the displacement refinement operation is a disparity refinement operation.

* * * * *